(12) United States Patent
Ogasawara

(10) Patent No.: US 7,012,722 B2
(45) Date of Patent: Mar. 14, 2006

(54) HOLOGRAPHIC RECORDING APPARATUS

(75) Inventor: Masakazu Ogasawara, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 11/004,129

(22) Filed: Dec. 6, 2004

(65) Prior Publication Data
US 2005/0179969 A1    Aug. 18, 2005

(30) Foreign Application Priority Data
Feb. 16, 2004    (JP)    .............................. 2004-038578

(51) Int. Cl.
*G03H 1/00*    (2006.01)
(52) U.S. Cl. ............................ 359/30; 359/11; 359/10; 359/3; 369/112.01; 369/94
(58) Field of Classification Search ............... 359/11, 359/30
See application file for complete search history.

(56) References Cited

U.S. PATENT DOCUMENTS

| | | | | |
|---|---|---|---|---|
| 6,738,322 B1 * | 5/2004 | Amble et al. | ............. | 369/44.27 |
| 2002/0114027 A1 * | 8/2002 | Horimai | ....................... | 359/11 |
| 2002/0176331 A1 * | 11/2002 | Ariyoshi et al. | ......... | 369/44.23 |
| 2005/0162719 A1 * | 7/2005 | Ogasawara et al. | ........... | 359/22 |

FOREIGN PATENT DOCUMENTS

JP    11-311937    11/1999

* cited by examiner

Primary Examiner—Fayez G. Assaf
(74) Attorney, Agent, or Firm—Sughrue Mion, PLLC

(57) ABSTRACT

A holographic recording apparatus which can stably record data to be recorded onto a recording medium. The holographic recording apparatus of the present invention includes: a light source for generating a coherent reference light beam; a signal light generation unit including a spatial light modulator for spatially modulating the reference light beam in accordance with information data to generate a signal light beam; an interference unit for directing the signal light beam and the reference light beam toward a recording medium through an objective lens to form a region of a diffraction grating formed by an optical interference pattern within the recording medium; a lens positioning unit for positioning the objective lens with respect to a recording surface of the recording medium; and a light-receiving unit for detecting a returned beam that is returned from the recording medium through the objective lens. The signal light generation unit includes correction unit for detecting an amount of an optical positional offset between a recording data setting area in the spatial light modulator being supplied with said information data and an aperture area of the objective lens, and for adjusting a position of the recording data setting area in accordance with the amount of a optical positional offset.

9 Claims, 18 Drawing Sheets

(a1)  (a2)  (a3)  (a4)  (a5)

(b1)  (b2)  (b3)  (b4)  (b5)

(a−1)

(a−2)

(a-1)  (a-2)

(b-1)  (b-2)

HOLOGRAPHIC RECORDING APPARATUS

BACKGROUND OF THE INVENTION

1. Field of the Invention

The present invention relates to a holographic recording apparatus.

2. Description of the Related Art

In order to achieve high-density information recording, hologram draws attention, which allows a data signal to be recorded with high density. A feature of this hologram is to record wavefront of light carrying information to be recorded onto a recording medium formed of a photosensitive material, such as a photorefractive material, as change of refractive index in terms of volume. For example, a recording and reproduction system that uses a holographic recording medium in the form of a disk (holographic disk) has been developed (see Japanese Patent Kokai No. 11-311937).

FIG. 1 shows the principle of holographic recording and reproduction. A holographic disk 1 as an exemplary holographic recording medium used in this holographic recording and reproduction includes a hologram layer, a reflection film, and a protection layer that are formed over an entire principal surface of a transparent substrate in the form of a disc in that order. In a reflection surface of the reflection film of the holographic disk, servo areas 2 are provided at intervals of a predetermined rotation angle and a data area 3 is provided in a fan-like section between the adjacent servo areas 2.

The holographic recording and reproduction requires an objective lens for making signal light and reference light incident on such a holographic disk. The objective lens 4 is positioned by an actuator 5 that can move in a thickness direction and a track direction of the holographic disk. In the case in which laser light emitted from the objective lens does not follow a track on the holographic disk because of eccentricity of the holographic disk or the like, the actuator 5 moves the objective lens 4 based on a signal from a servo controller (not shown), thereby that laser light can be incident on the data area 3 correctly.

In the holographic recording and reproduction, reference light is made incident on the holographic disk 1 by using the objective lens 4 so as to pass through the hologram layer and be converged as a spot on the reflection film. The reference light reflected by the reflection film passes through the hologram layer again. Moreover, signal light carrying information to be recorded is also made to pass through the hologram layer by using the objective lens 4. Thus, the reflected reference light and the signal light interfere with each other in the hologram layer to generate an interference pattern, thereby volume hologram is recorded in the hologram layer. In addition, recorded information can be reproduced by irradiating the holographic disk with the reference light and detecting and decoding reproduction light that is restructured from respective holograms.

In an apparatus for performing the aforementioned holographic recording and reproduction, the center of the aperture area of the objective lens (i.e. effective diameter of the lens) may be off from the optical axis of the signal light. In this case, a part of the signal light may be prevented from passing through the aperture area of the objective lens and reaching the data area of the holographic disk. In other words, a part of information to be recorded and being carried by the signal light may not be recorded.

Moreover, in order to record information in the hologram layer of the holographic disk by a holographic recording and reproduction apparatus, the data area has to be irradiated with the signal light for a predetermined time, for example, because a response time of the photosensitive material used as the hologram layer is long. Thus, in the case in which the holographic disk is to be rotated, it is necessary to perform positioning of the objective lens in such a manner that the objective lens follows the data area in order to irradiate the data area with the signal light for the predetermined time. However, during the positioning operation, the center of the aperture area of the objective lens may deviate from the optical axis of the signal light.

Therefore, an exemplary problem to be solved by the present invention is to provide a holographic recording apparatus that can make signal light carrying data to be recorded incident on a recording medium so as to correctly record that data onto the recording medium, even if an optical axis of an objective lens is displaced with respect to an optical axis of the signal light.

SUMMARY OF THE INVENTION

According to a first aspect of the present invention, a holographic recording apparatus comprises: a light source for generating a coherent reference light beam; a signal light generation unit including a spatial light modulator for spatially modulating the reference light beam in accordance with information data to generate a signal light beam; an interference unit for directing the signal light beam and the reference light beam toward a recording medium through an objective lens to form a region of a diffraction grating by an optical interference pattern within the recording medium; a lens positioning unit for positioning the objective lens with respect to a recording surface of the recording medium; and a light-receiving unit for detecting a returned beam that is returned from the recording medium through the objective lens, wherein the signal light generation unit includes a correction unit for detecting an amount of a optical positional offset between a recording data setting area in the spatial light modulator being supplied with said information data and an aperture area of the objective lens, and for adjusting a position of the recording data setting area in accordance with the amount of a optical positional offset.

DETAILED DESCRIPTION OF THE INVENTION

An operation of a holographic recording apparatus according to the present invention will now be described with reference to the drawings.

Figure 1:
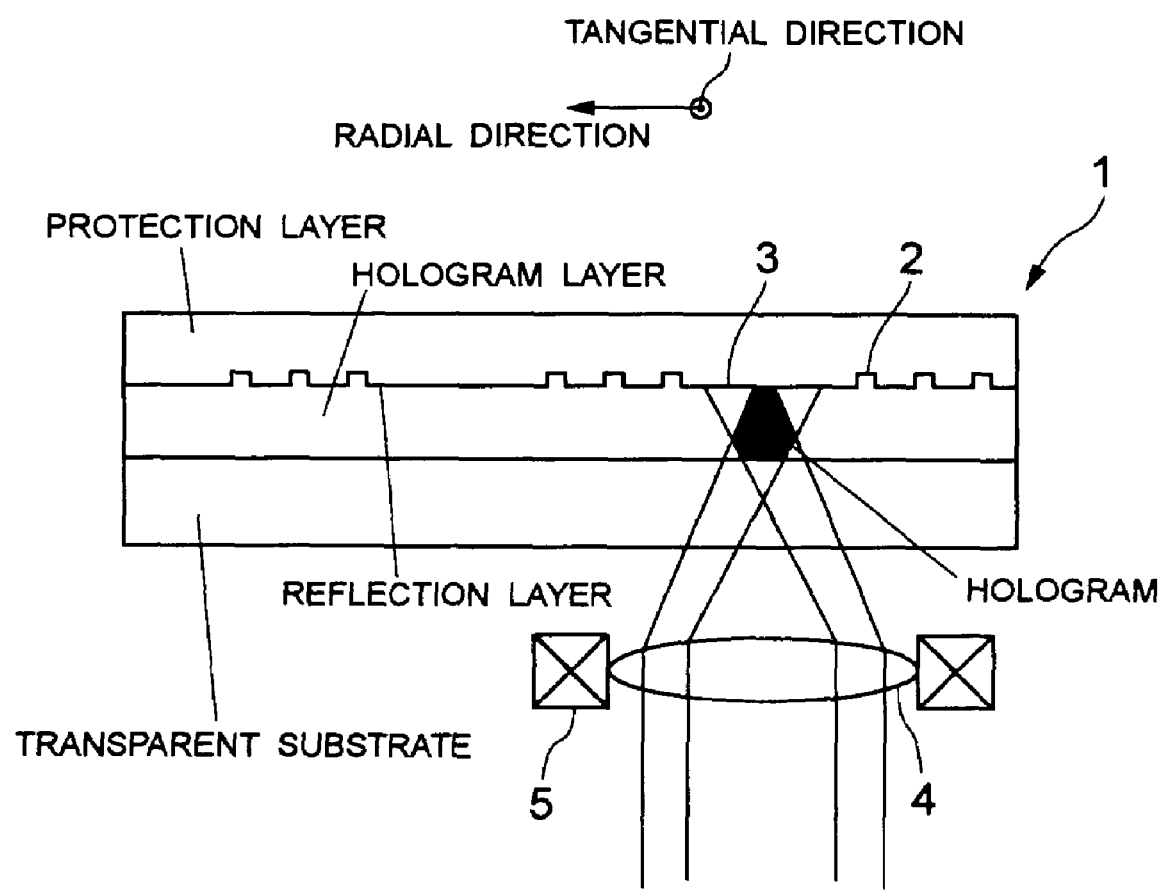
FIG. 1 is a partial cross-sectional view for explaining the principle of holographic recording and reproduction.
Figure 2:
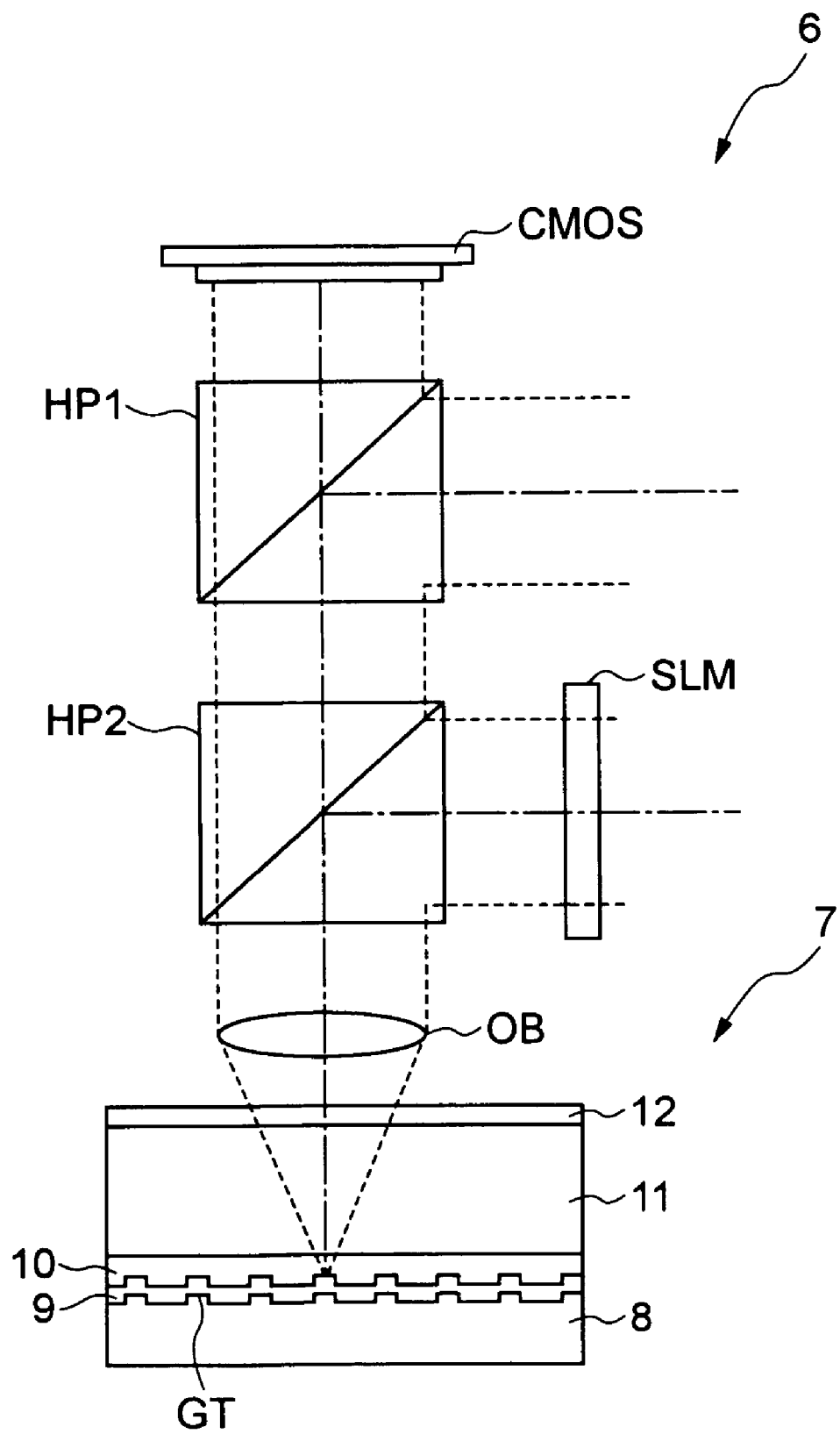
FIG. 2 is a schematic partial cross-sectional view of a holographic recording apparatus according to the present invention.

Recording of hologram is performed by a holographic recording apparatus that emits signal light carrying information to be recorded and reference light to a holographic recording medium. For example, as shown in FIG. 2, the holographic recording apparatus 6 includes a light-receiving unit CMOS, a first half mirror prism HP1, a second half mirror prism HP2 and an objective lens OB that are arranged on the same optical axis (dashed line) in that order. For the sake of convenience, the side of the first half mirror prism HP is called as an upstream side, while the objective-lens OB side is called as a downstream side.

The light-receiving unit CMOS includes a photodetector in which a plurality of light-receiving elements are arranged in a matrix such as CMOSs and can receive signal light from a recording medium which will be described later, and can convert that signal light into data.

The reflection surface of the first half mirror prism HP1 is arranged so as to reflect reference light be incident thereon from a direction perpendicular to the aforementioned optical axis toward the downstream side on the optical axis.

The reflection surface of the second half mirror prism HP2 is arranged so as to reflect signal light be incident thereon from a direction perpendicular to the aforementioned optical axis toward the downstream side on the optical axis. The second half mirror prism HP2 combines the signal light and the reference light and directs them toward the objective lens to be incident on the objective lens OB.

A spatial light modulator SLM can spatially modulate laser light in accordance with information data supplied thereto and includes a plurality of light modulation devices. For example, a liquid crystal panel including a plurality of pixel electrodes divided in the form of a matrix can be used as the spatial light modulator. In case of the liquid crystal panel, each pixel has a function of transmitting and blocking light incident thereon and also has a function of changing a direction of a polarization plane of the incident light. Such a pixel forms one bit of information data. In the case in which one bit of digital data "0" or "1" is represented by one pixel, the one bit can be represented by the presence and absence of light transmitted by that pixel or the presence and absence of change of the polarization plane.

The objective lens OB is provided with an objective lens driving unit (not shown) that includes a focusing unit for moving the objective lens OB in the optical-axis direction and a tracking unit for moving the objective lens OB in a disk-radial direction perpendicular to the optical axis and a tracking direction. The driving unit is connected to a focusing servo and a tracking servo (both not shown) and allows the objective lens to follow a track on the recording medium so as to focus light onto the recording medium.

A beam diameter of the signal light and the reference light is larger than a space that can transmit and focus light incident on the objective lens, i.e., an aperture area of the objective lens. A range in which the aperture area can move with the movement of the objective lens is set within the beam diameter of the signal light and the reference light. (In FIG. 2, the aperture area of the objective lens is set to be coincident with the beam diameter of the signal light and the reference light for simplification.)

In the downstream of the objective lens, a holographic disk 7 as a holographic recording medium in the form of a disk can be arranged. The holographic disk 7 includes a reflection layer 9, a separation layer 10, a recording layer 11, and a protection layer 12 that are formed on a substrate 8, for example, and the protection layer 12 faces the objective lens.

The substrate 8 is a plane-parallel plate formed of glass, plastic or the like which contains addresses or a track structure formed in advance. The reflection layer 9 is formed by a layer of metal such as aluminum, or a dielectric multilayer film and contains grooves as a plurality of guide tracks GT that are away from each other and extend without crossing each other. The reflection layer 9 serves as a guide layer. The guide tracks are provided at least for performing control of a tracking servo. The recording layer 11 is formed of a photosensitive material in which an optical interference pattern can be held such as a photorefractive material, a hole burning material, and a photochromic material. Hologram is recorded in the recording layer above the guide track GT. The separation layer 10 and the protection layer 12 are formed of a light transmitting material in order to flatten a multilayer structure and protect the recording layer and the like.

Figure 3:
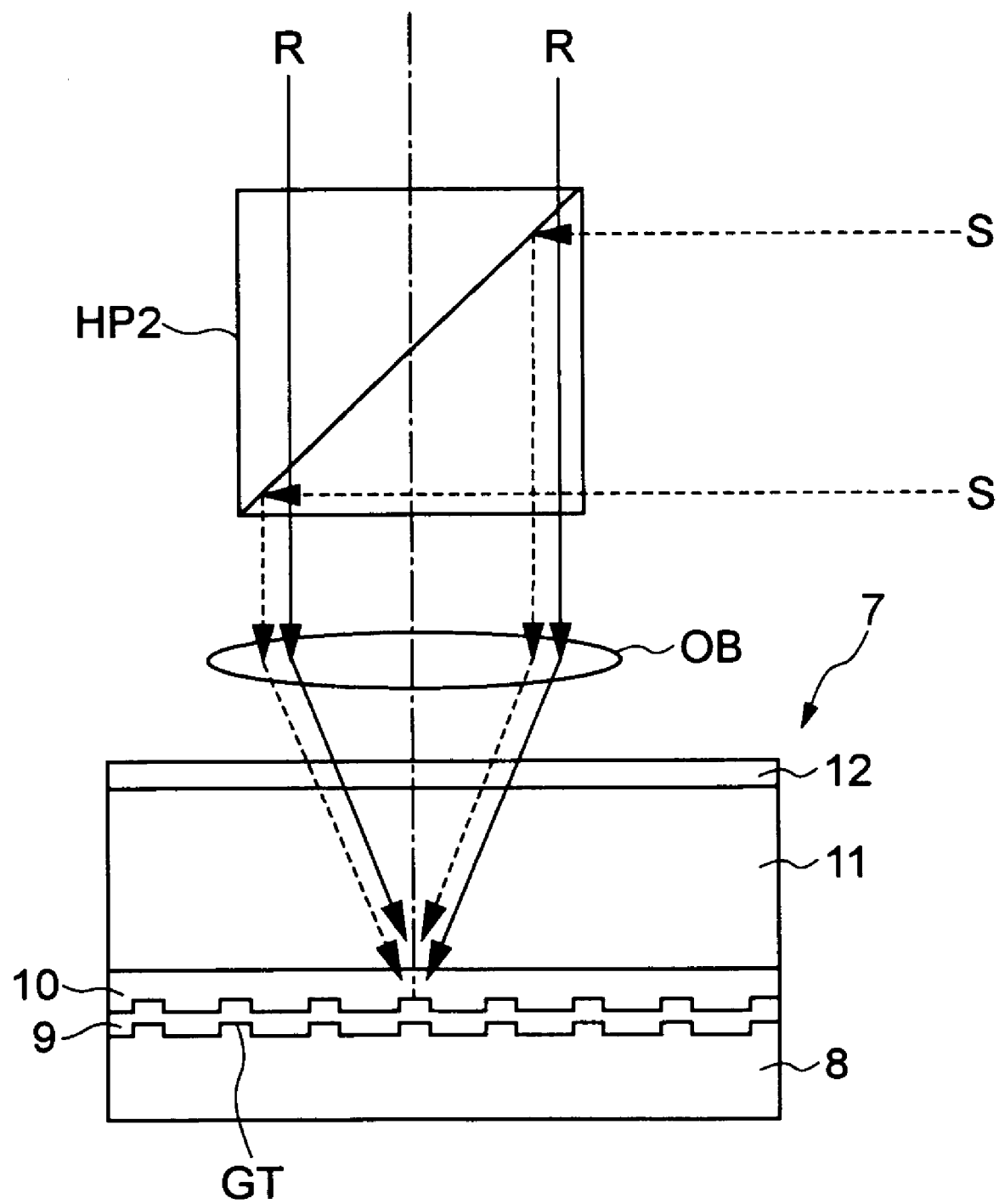
FIG. 3 is a schematic partial cross-sectional view for explaining the principle of recording by the holographic recording apparatus according to the present invention.

Referring to FIG. 3, a recording operation is described. In FIG. 3, reference light is shown with arrow of solid line, while signal light is shown with arrow of broken line. They are shown as being off from the optical axis shown in FIG. 2 in order to explain the respective optical paths thereof.

As shown in FIG. 3, the reference light R reflected from the reflection surface (not shown) of the first half mirror prism HP1 (not shown) is incident on the second half mirror prism HP2. The reference light R is transmitted by the second half mirror prism HP2 and is then converged by the objective lens OB to be incident on the recording layer 11 of the holographic disk 7.

The signal light S shown with arrow of broken line in FIG. 3 is reflected from the second half mirror prism HP2 and is then converged by the objective lens OB so as to be incident on the recording layer 11 of the holographic disk 7.

In the recording layer 11, the reference light R and the signal light S interfere with each other to form an interference pattern. This interference pattern is held and recorded in the recording layer 11.

In the above-descried manner, hologram can be recorded onto the recording medium.

Figure 4:
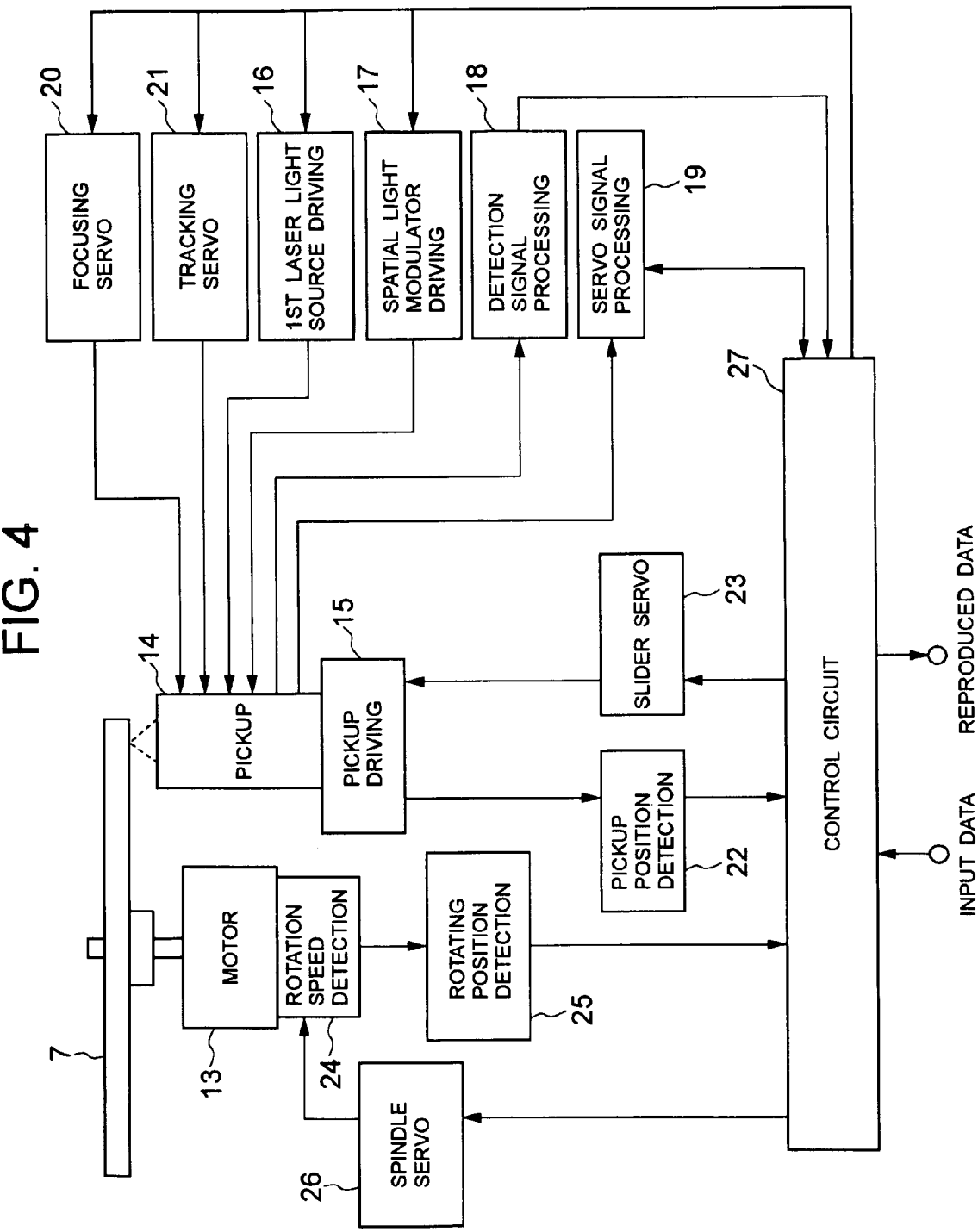
FIG. 4 is a schematic block diagram showing the configuration of the holographic recording apparatus according to the present invention.

FIG. 4 schematically shows an exemplary structure of the holographic recording apparatus for recording information onto a holographic disk according to the present invention. The holographic recording apparatus includes a spindle motor 13 for rotating the holographic disk 7 via a turntable, a pickup 14 for reading out a signal from the holographic disk 7 by using a light beam, a pickup driving unit 15 for holding the pickup and moving it in the disk-radial direction, a first laser light source driving circuit 16, a spatial light modulator driving circuit 17, a detection signal processing circuit 18, a servo signal processing circuit 19, a focusing servo circuit 20, a tracking servo circuit 21, a pickup position detection circuit 22 that is connected to the pickup driving unit 15 and detects a position signal of the pickup, a slider servo circuit 23 that is connected to the pickup driving unit 15 and supplies a predetermined signal thereto, a rotation speed detection unit 24 that is connected to the spindle motor 13 and detects a rotation speed signal of the spindle motor 13, a rotating position detection circuit 25 that is connected to the rotation speed detection unit 24 and generates a rotating position signal of the holographic disk 7, a spindle servo circuit 26 that is connected to the spindle motor 13 and supplies a predetermined signal thereto, and a control circuit 27 that is connected to the spindle servo circuit 26. The control circuit 27 carries out focusing and tracking servo controls for the pickup via the above-listed driving circuits based on signals delivered from the above-listed circuits. The control circuit 27 is formed by a microcomputer including various memories therein and controls the entire recording apparatus. The control circuit 27 generates various kinds of control signals in accordance with an operating input by a user through an operating unit (not shown) and a current operating status of the recording apparatus, and is connected to a display (not shown) for displaying the operating status to the user. Moreover, the control circuit 27 performs processing of data to be recorded that has been input from the outside such as encoding of data and supplies a predetermined signal to the spatial light modulator driving circuit 17, so as to control the recording operation. Furthermore, the control circuit 27 corrects an optical positional offset between the objective lens (not shown) provided in the pickup 14 and a recording data setting area (not shown) in the spatial light modulator (to which data to be recorded is supplied) based on a signal from the light-receiving unit (not shown) provided in the pickup or from the detection signal processing circuit 18 connected to an objective lens detection unit (not shown) for measuring the displacement amount of the objective lens, so that the control circuit 27 controls the spatial light modulator driving circuit 17.

Figure 5:
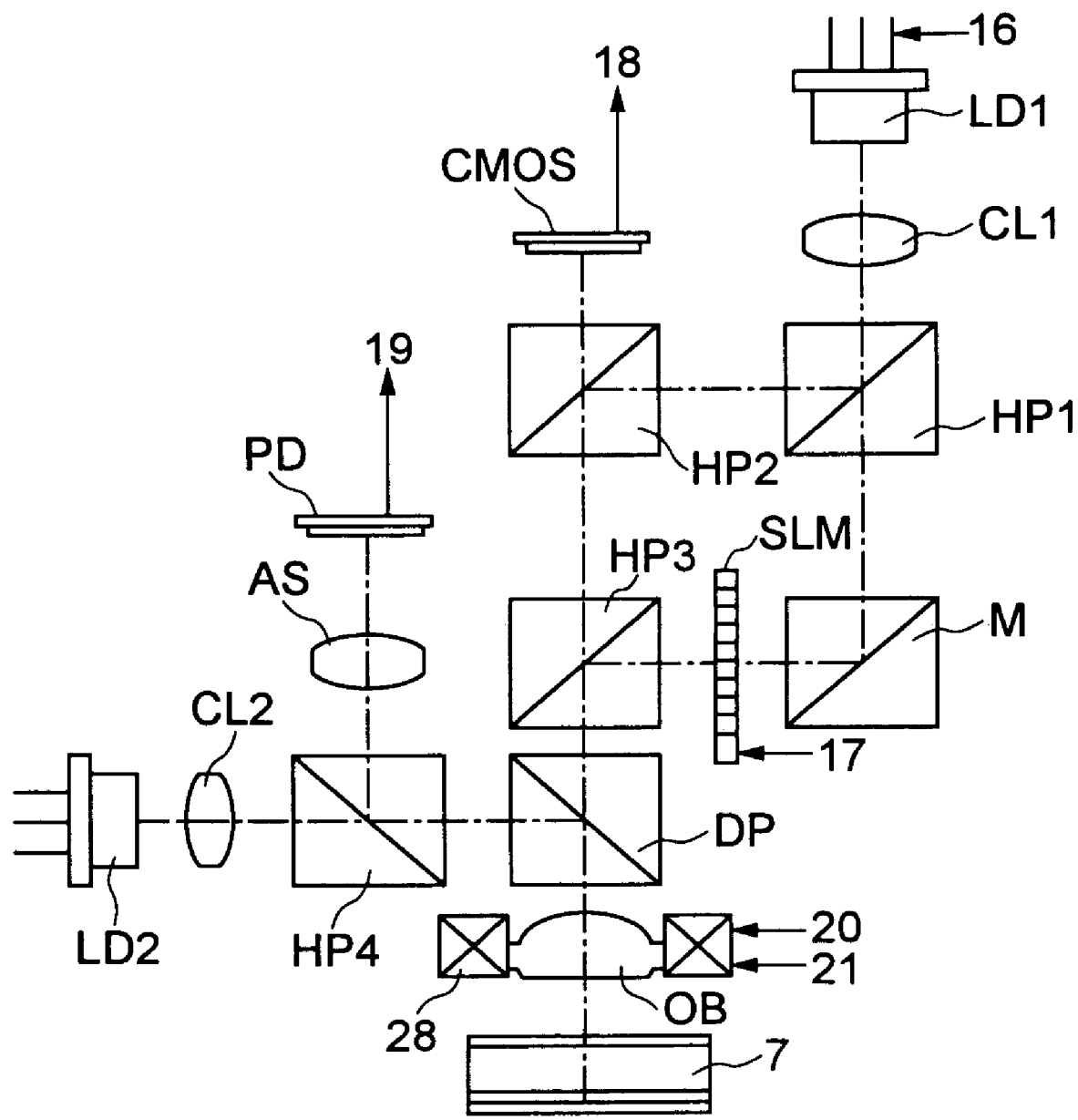
FIG. 5 schematically shows a pickup of the holographic recording apparatus according to the present invention.

FIG. 5 schematically shows an exemplary configuration of the pickup of the aforementioned recording apparatus. The pickup shown in FIG. 5 comprises a recording optical system that includes: a first laser light source LD1 for holographic recording; a first collimator lens CL1, a first half mirror prism HP1; a mirror prism M; a spatial light modulator SLM; a light-receiving unit CMOS including an image detection sensor formed by an array of CCDs or complimentary metal oxide semiconductor devices; a second half mirror prism HP2; and a third half mirror prism HP3. The pickup further comprises a servo system as a servo signal detection unit including: a second laser light source LD2 for performing servo controls (focusing and tracking servo controls) for a position of a light beam with respect to the holographic disk 7; a second collimator lens CL2, a fourth half mirror prism HP4; an astigmatism device AS such as a cylindrical lens; and a photodetector PD, and a common system including a dichroic prism DP and an objective lens OB. The recording optical system, the servo system, and the common system are arranged on substantially the same plane except for the objective lens OB. The first, second, and third half mirror prisms HP1, HP2, and HP3 and the mirror prism M are arranged in such a manner that the half mirror surfaces of the half mirror prisms HP1, HP2, and HP3 and the reflection surface of the mirror prism M are parallel to each other. Moreover, in a normal line direction with respect to those half mirror surfaces and reflection surface, the separation surface of the dichroic prism DP and the half mirror surface of the fourth half mirror prism HP4 are arranged to be parallel to each other. The aforementioned optical devices are arranged in such manner that optical axes of light beams from the first and second laser light sources LD1 and LD2 (shown as dashed lines) extend in the recording optical system and the servo system, respectively, and are then combined in the common system.

Furthermore, the pickup 14 is provided with an objective lens driving unit 28 formed by a focusing unit for moving the objective lens OB in the optical-axis direction and a tracking unit for moving the objective lens OB in a disk-radial direction (and a direction perpendicular thereto). Please note that the disk-radial direction is perpendicular to the optical axis of the objective lens OB.

The first laser light source LD1 is connected to the first laser light source driving circuit 16 that adjusts the output of the first laser light source LD1 so as to decrease the intensity of an emitted light beam when a position of the recording data setting area is corrected and to increase that intensity when the recording is preformed.

The spatial light modulator SLM is formed by a liquid crystal panel having a plurality of pixel electrodes each divided in the form of a matrix, for example, and has a function of electrically blocking a part of light incident thereon or transmitting all the incident light. The spatial light modulator SLM is connected to the spatial light modulator driving circuit 17, and modulates a light beam to have a distribution based on information data from the spatial light modulator driving circuit 17, thereby generating signal light.

The light-receiving unit CMOS including the image detection sensor is connected to the detection signal processing circuit 18. The detection signal processing circuit 18 processes a light-receiving signal from the light-receiving unit CMOS to obtain a positional offset signal corresponding to the amount of the optical positional offset between the objective lens OB and the recording data setting area (not shown) in the spatial light modulator SLM, and supplies that signal to the control circuit 27.

The photodetector PD is connected to the servo signal processing circuit 19. The photodetector PD has a shape of a light-receiving device divided for focusing and tracking servo which is typically used for an optical disk. As a servo technique, an astigmatism method or a push-pull method can be applied. Output signals of the photodetector PD such as a focusing error signal and a tracking error signal are supplied to the servo signal processing circuit 19.

In the servo signal processing circuit 19, a focusing driving signal is generated from the focusing error signal and is then supplied to the focusing servo circuit 20 via the control circuit 27. The focusing servo circuit 20 drives the focusing unit of the objective lens driving unit 28 mounted on the pickup 14, in accordance with the focusing driving signal. The focusing unit operates to adjust the focus position of a spot formed by light incident on the holographic disk.

Moreover, in the servo signal processing circuit 19, a tracking driving signal is generated from the tracking error signal and is then supplied to the tracking servo circuit 21. The tracking servo circuit 21 drives the tracking unit of the objective lens driving unit 28 mounted on the pickup 14 in accordance with the tracking driving signal. The tracking unit displaces the position of the spot formed by the light incident on the holographic disk in the disk-radial direction or the track direction by the amount corresponding to a driving current generated by the tracking driving signal.

The control circuit 27 generates a slider driving signal based on the position signal from the operating unit or pickup position detection circuit 22 and the tracking error signal from the servo signal processing circuit 19, and supplies the slider driving signal to the slider servo circuit 23. The slider servo circuit 23 causes the pickup 14 to move in the disk-radial direction via the pickup driving unit 15 in accordance with a driving current generated by the slider driving signal.

The rotation speed detection unit 24 detects a frequency signal indicating a current rotation frequency of the spindle motor 13 that rotates the holographic disk 7 by the turntable, generates a rotation speed signal indicating the number of revolutions of the spindle motor that corresponds to the detected rotation frequency, and supplies the rotation speed signal to the rotating position detection circuit 25. The rotating position detection circuit 25 generates a rotating position signal and supplies it to the control circuit 27. The control circuit 27 generates a spindle driving signal and supplies it to the spindle servo circuit 26, thereby controlling the spindle motor 13 to rotate the holographic disk 7.

Next, a recording method for recording information by making a light beam incident on the holographic disk, by means of the aforementioned holographic recording apparatus will be described.

Figure 6:
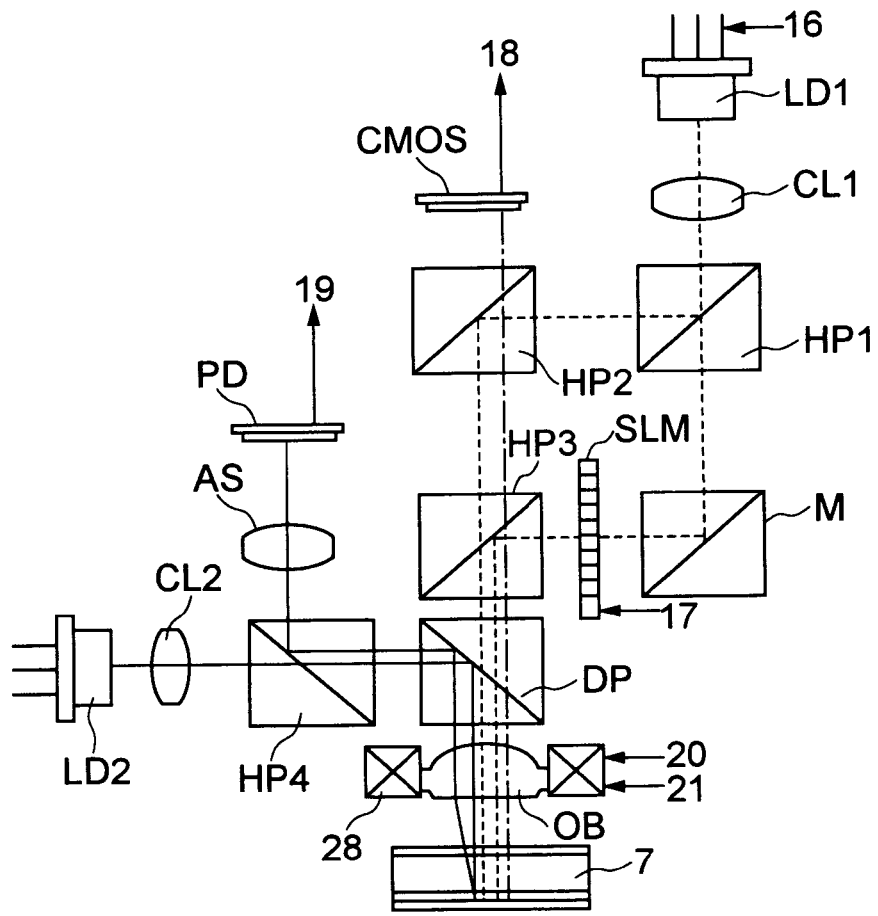
FIG. 6 schematically shows the pickup of the holographic recording apparatus according to the present invention.

As shown in FIG. 6, the second laser light source LD2 for servo control emits coherent light having a different wavelength from that of light emitted from the first laser light source LD1. The servo light beam from the second laser light source LD2 is directed to an optical path for servo detection including the second collimator lens CL2 and the fourth half mirror prism HP4 and is then incident on the dichroic prism DP. The servo light beam is reflected by the dichroic prism DP and is then converged by the objective lens OB so as to be incident on the holographic disk 7 (the servo light beam is shown with a thin solid line, while being off from the optical axis in order to explain the optical path thereof). A returning light beam of the servo light beam that has been reflected from the holographic disk 7 toward the objective lens OB is directed to the fourth half mirror prism HP4 and then passes through the astigmatism device AS, so as to be incident on the servo photodetector PD along a normal line direction with respect to the light-receiving surface of the photodetector PD.

Figure 7:
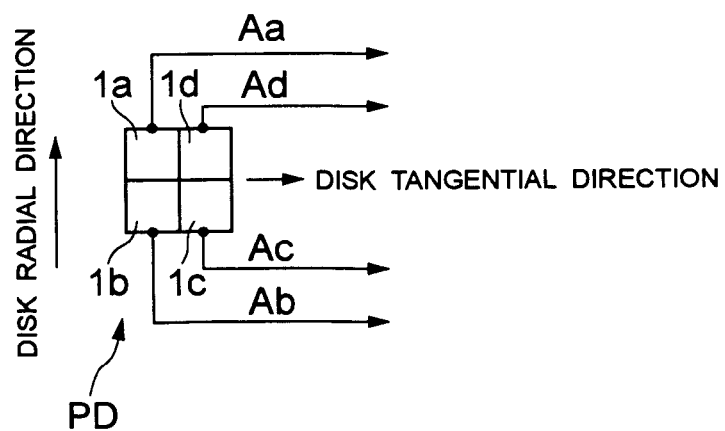
FIG. 7 is a plan view showing a photodetector in the pickup of the holographic recording apparatus according to the present invention.

By using the above servo light beam, positioning servo control with respect to the holographic disk 7 is performed. In case of an astigmatism method, the photodetector PD is formed by light-receiving devices $1a$ through $1d$ forming the light-receiving surface for receiving the servo light beam, the surface being equally divided into four sections, as shown in FIG. 7, for example. Division lines in the light-receiving surface correspond to the disk-radial direction and the track tangential direction, respectively. The photodetector PD is set in such a manner that a spot of light when the light is in focus forms a circle having a center at an intersection of the division lines on the light-receiving devices $1a$ through $1d$.

The servo signal processing circuit 19 generates an RF signal Rf, a focusing error signal FE, and a tracking error signal TE in accordance with respective output signals from the light-receiving devices $1a$ through $1d$. Assuming that the output signals of the light-receiving devices $1a$ through $1d$ are Aa through Ad, respectively, the RF signal Rf is calculated by Rf=Aa+Ab+Ac+Ad, the focusing error signal FE is calculated by FE=(Aa+Ac)−(Ab+Ad), and the tracking error signal TE is calculated by TE=(Aa+Ad)−(Ab+Ac). Those error signals are supplied to the control circuit 27.

In the above embodiment, the focusing servo and the tracking servo are preformed by an astigmatism method and a push-pull method, respectively. However, the present invention is not limited thereto. Other known methods, for example, a three-beam method, may be used.

After completion of the servo control, as shown in FIG. 6, the first laser light source LD1 emits coherent light having the intensity weaker than the intensity that causes a recording sensitivity in the recording medium. That coherent light is split by the first half mirror prism HP1 into a reference light beam and a signal light beam (both of those beams are shown with broken lines while being off from the optical axis in order to explain the optical paths thereof).

The signal light beam is reflected by the mirror prism M and is then incident on the principal surface of the spatial light modulator SLM along a normal line direction with respect to the principal surface. The spatial light modulator SLM transmits the signal light beam incident on a no-modulation region, i.e., unblocking region, thereby spatially modulating the signal light. The modulated signal light is directed toward the third half mirror prism HP3.

The reference light beam is reflected by the second half mirror prism HP2 so as to be directed toward the third half mirror prism HP3.

The reference light beam and the signal light beam are combined by the third half mirror prism HP3. The thus combined light beams pass through the dichroic prism DP and are then converged by the objective lens OB on the holographic disk 7, so that hologram is formed on the recording layer. This hologram is not recorded in the recording layer because the intensity of the coherent light from the first laser light source LD 1 is not strong.

The signal light beam reflected from the reflection layer of the holographic disk 7 (which is shown with a dashed line while being off from the optical axis in order to explain the optical path thereof) is incident on the objective lens, then passes through the dichroic prism DP, the third half mirror prism HP3, and the second half mirror prism HP2 and is finally incident on the light-receiving unit CMOS including the image detection sensor. The image detection sensor converts the received light into an electric signal and supplies that electric signal to the detection signal processing circuit 18. The detection signal processing circuit 18 generates a positional offset signal corresponding to the amount of positional offset between the aperture area of the objective lens and the recording data setting area from that electric signal, and supplies the positional offset signal to the control circuit 27. The control circuit 27 processes that positional offset signal so as to obtain the amount of the positional offset between the position of the recording data setting area and the aperture area of the objective lens as the number of pixels of the spatial light modulator. The control circuit 27 then corrects a position in the recording data setting area, at which information data that will be supplied to the spatial light modulator driving circuit 17 is set, in accordance with the amount of the positional offset.

The spatial light modulator driving circuit 17 receives the information data for which correction has been performed by the control circuit 27, and supplies the received information data to the spatial light modulator SLM. In this state, the output of the first laser light source LD1 is increased to the intensity which causes the sensitivity in the recording layer of the holographic disk after the completion of the position correction for the recording data setting area, thereby recording hologram in the recording layer.

Figure 8:
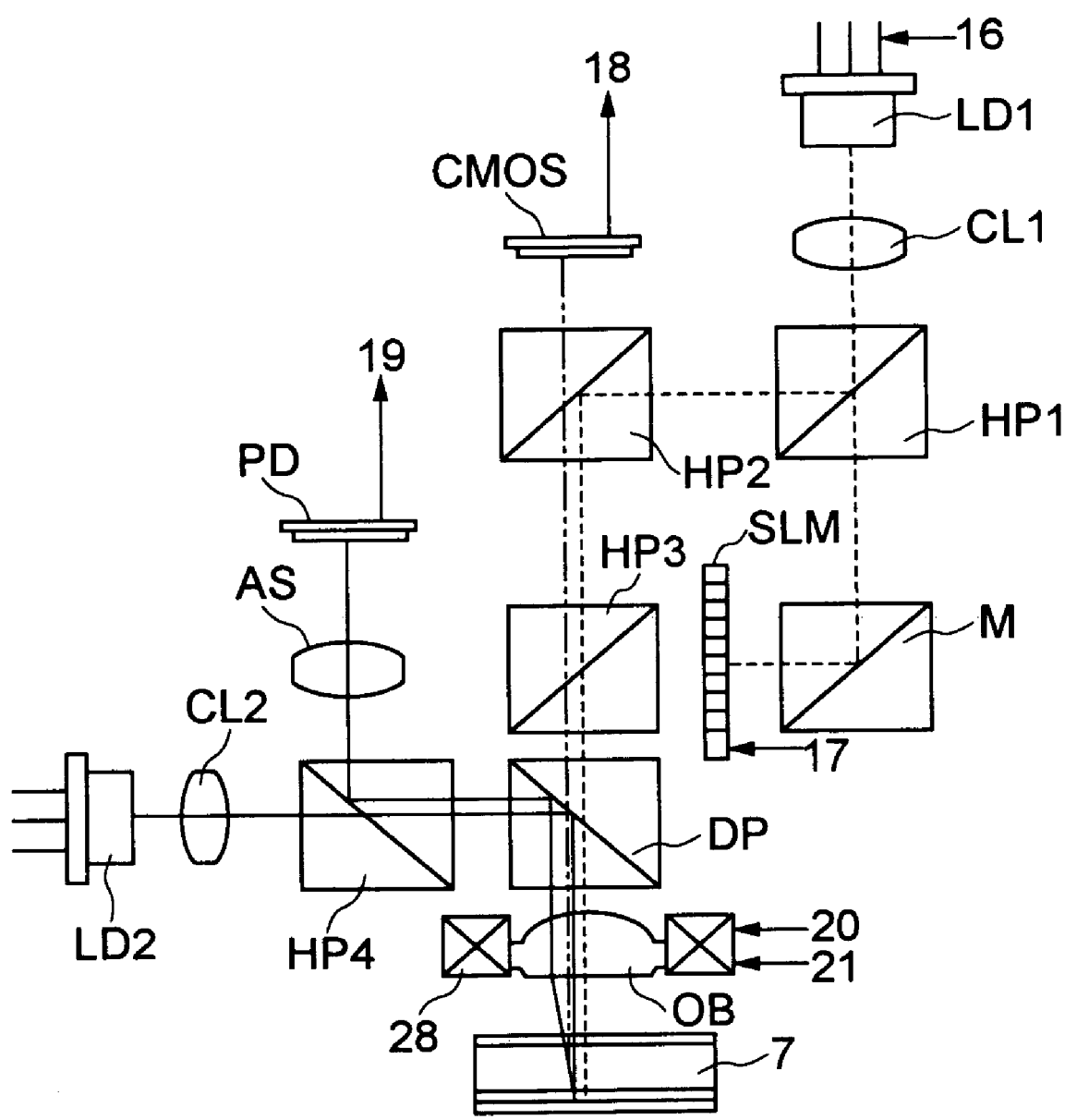
FIG. 8 schematically shows the pickup of the holographic recording apparatus according to the present invention.

The pickup having the aforementioned structure can be also used for reproducing hologram from the recording medium. In reproduction, as shown in FIG. 8, light is split into a reference light beam and a signal light beam by the first half mirror prism HP1 as in the recording operation. However, reproduction of hologram is performed by using the reference light beam only. By placing the spatial light modulator SLM in the light-blocking state, only the reference light beam that has been directed from the first half mirror prism HP1 to the second half mirror prism HP2 and has been then reflected from the second half mirror prism HP2 passes through the dichroic prism DP and the objective lens OB and is then incident on the holographic disk 7.

Reproduction light (chain double-dashed line) generated from the holographic disk 7 is transmitted through the objective lens OB, the dichroic prism DP, the third half mirror prism HP3, and the second half mirror prism HP2, and is then incident on the light-receiving unit CMOS including the image detection sensor. The image detection sensor sends an output corresponding to an image formed by the reproduction light to the detection signal processing circuit 18 which in turn generates a reproduction signal and supplies it to the control circuit 27 so as to reproduce recorded data. In reproduction, the positioning servo control with respect to the holographic disk 7 is also performed by using the servo light beam as in recording.

Next, unit for detecting offset of the optical axis of the objective lens and unit for adjusting the recording data setting area according to the present invention will be described.

In order to simplify the description, information data supplied to the spatial light modulator is two-dimensionally shown. More specifically, an area for transmitting light incident thereon is assumed to be "1" shown with white color while an area for blocking light incident thereon is assumed to be "0" shown with black color (the same assumption is also applied to the description that will be made later). Such two-dimensional data is called as page data. This page data is shown with a white and black pattern in the spatial light modulator, as shown in FIG. 9 (a-1).

The information data supplied to the spatial light modulator contains recording data to be recorded on the recording medium. The recording data is supplied to a recording data setting area RA (shown as an area surrounded by thick line for convenience of explanation, the same is applied to the later description) in the spatial light modulator. The information data may contain reference mark data that is data for aligning an optical position of the recording data setting area with respect to the range of the aperture area of the objective lens and forms a reference position mark (RM1a) having a shape like a square bracket that is in contact with the recording data setting area in the page data, for example. Such a pattern like a square bracket is provided on both sides of the center of the recording data area in both the X-direction and the Y-direction.

By making laser light having a space of wider than the recording data setting area RA incident on the above spatial light modulator SLM, signal light is generated.

Figure 9:
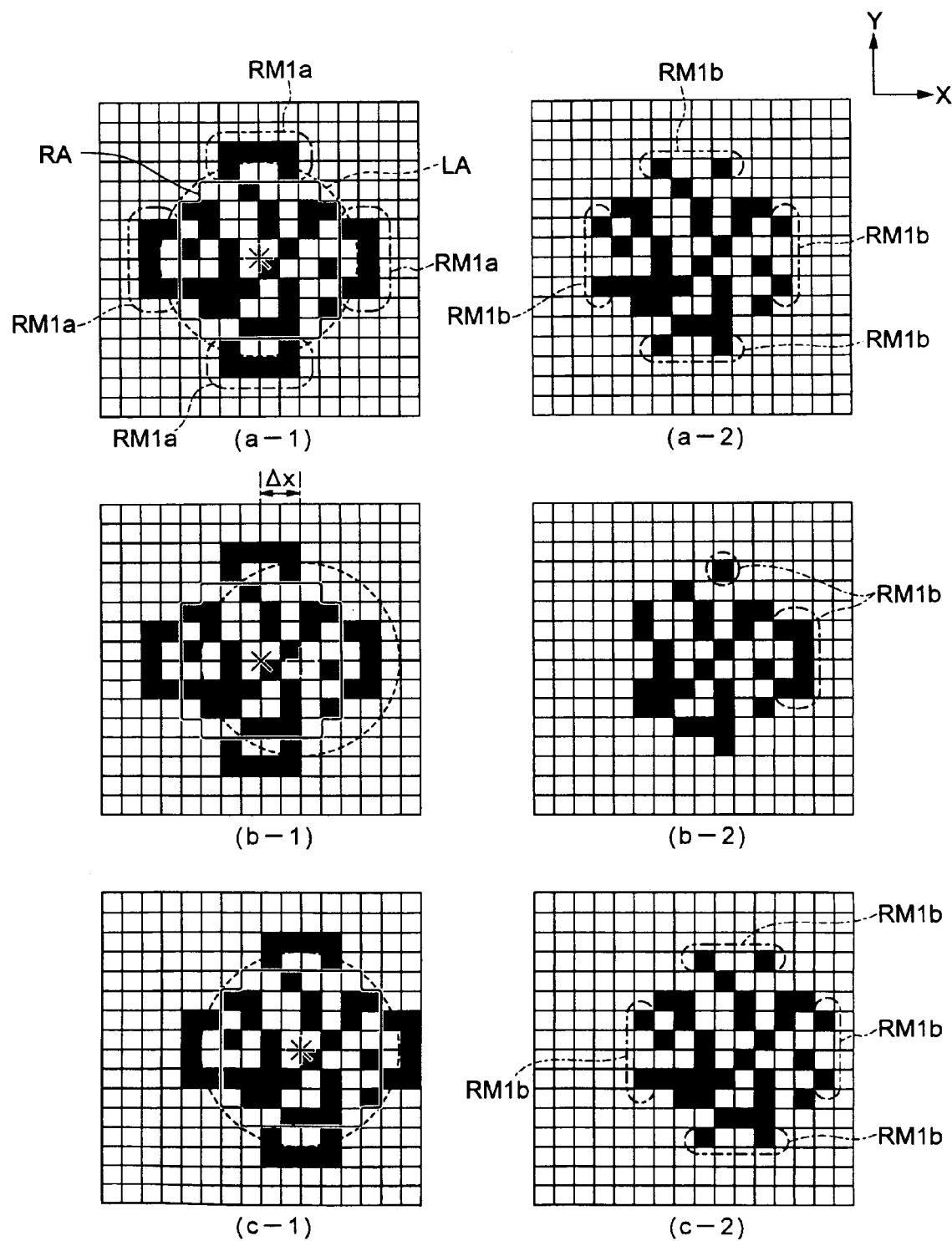
FIG. 9 shows plan views representing page data on a plane containing a plane of an objective lens on which signal light is incident (a-1, b-1 and c-1) and page data on a light-receiving unit (a-2, b-2 and c-2) according to the holographic recording apparatus of the present invention.

As shown in FIG. 9 (a-1), in the case in which the center ("+") of the aperture area LA (shown with chain circle for convenience, the same is applied to the later description) is coincident with the center ("×") of the recording data setting area RA on a plane containing a plane of the objective lens onto which the signal light is incident, while servo control for the objective lens is not performed, for example, the recording data setting area RA is completely contained within the aperture area LA of the objective lens. In other words, the signal light from the recording data setting area RA can pass through the aperture area LA of the objective lens. Thus, data contained in the light received and detected by the light-receiving unit (referred to as "received light data" hereinafter) contains a pattern in the recording data setting area and a part of the reference position mark (RM1b) in each side of that pattern in both the X-direction and the Y-direction, as shown in FIG. 9 (a-2). In this state, the center of the recording data setting area RA is determined as a reference position.

However, when the objective lens moved (by Δx) because the objective lens followed the track on the recording medium or the like, the center of the aperture area LA of the objective lens is off from the center of the recording data setting area RA (FIG. 9 (b-1)) and therefore the received light in the light received by the light-receiving unit does not contain the pattern in the recording data setting area and the part of the reference position mark (FIG. 9 (b-2)).

Thus, the amount of positional offset (Δx) between the center of the aperture area of the objective lens after moving and the reference position of the recording data setting area is obtained on the basis of the pattern of the reference position mark in the received light data, and the position of the recording data setting area RA in the spatial light modulator is corrected in such a manner that the center of the recording data setting area RA is coincident with the center of the aperture area LA of the objective lens (FIG. 9 (c-1)). As a result, the light-receiving unit is allowed to receive the signal light from the recording data setting area (FIG. 9 (c-2)). That is, the signal light from the recording data setting area can be made incident on the recording medium and therefore data to be recorded can be recorded onto the recording medium.

Figure 10:
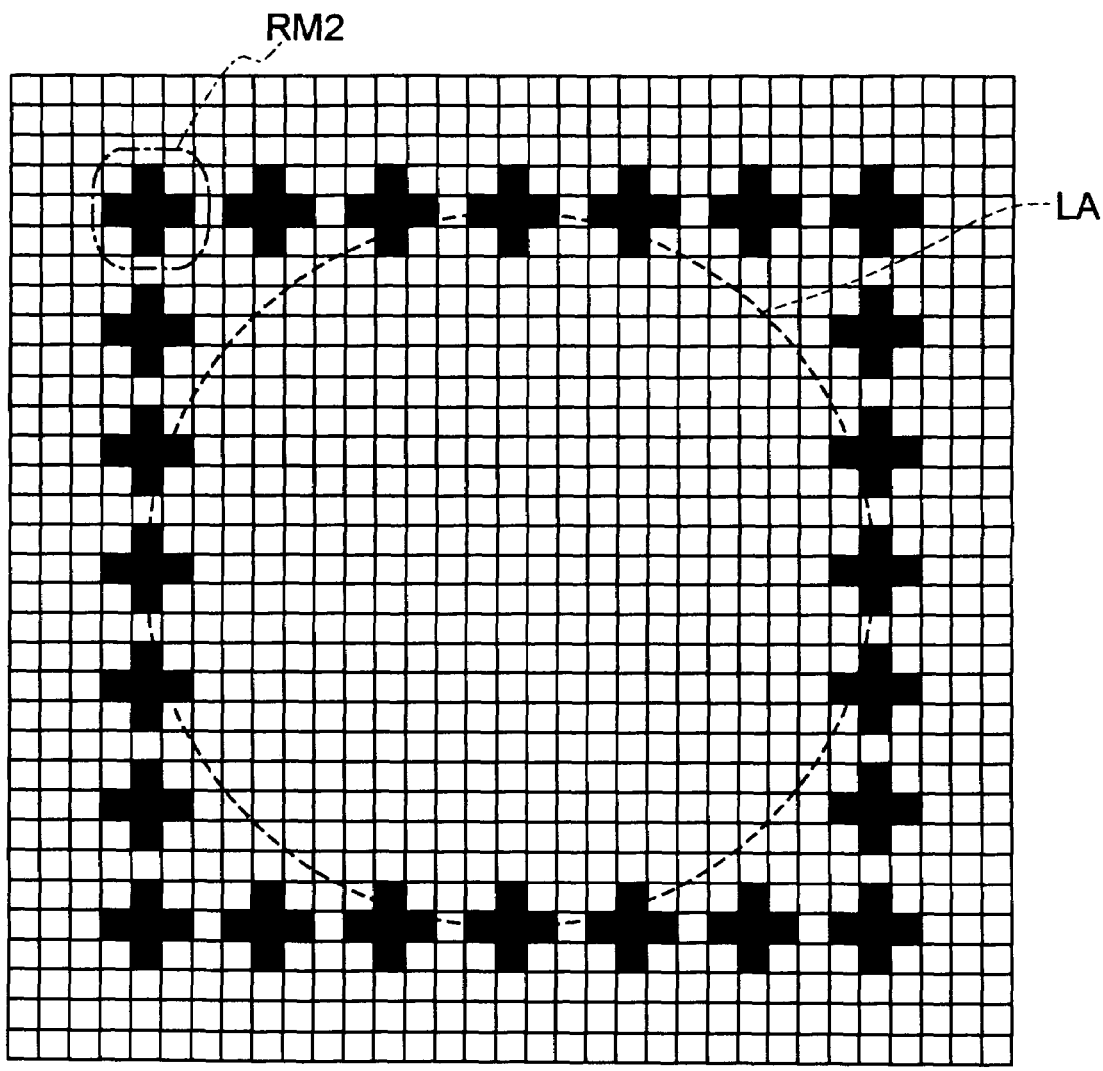
FIG. 10 is a plan view representing page data containing a reference position mark, which can be used in the holographic recording apparatus of the present invention.

The pattern of the reference position mark may be a pattern where a plurality of crosses (RM2) are arranged on each of edges of a rectangle in which the aperture area LA of the objective lens is inscribed in such a manner that one sides of the crosses form one side of that rectangle, as shown in FIG. 10, for example.

The correction of the position of the recording data setting area with respect to the aperture area of the objective lens has to be performed before data is recorded on the recording medium. In other words, when the recording operation is started, first the position of the objective lens is determined and the aforementioned correction is completed, and then the data should be recorded.

For example, after the start of the recording operation, a step of determining the position of the objective lens with respect to the recording medium by using tracking servo and focusing servo is performed. After this step of positioning the objective lens, the correction step is performed. The correction step includes: a step of generating signal light by making laser light having a power that does not cause sensitivity in the recording medium incident on the spatial light modulator to which information data is supplied; a step of making the signal light incident on a predetermined position via the objective lens; a step of receiving the signal light transmitted through the aperture area of the objective lens after the signal light has been incident on the predetermined position, so as to generate received light data; and a step of obtaining the amount of optical positional offset between the recording data setting area in the spatial light modulator and a range of the aperture area from the above received light data and adjusting the position of the recording data setting area with respect to the range of the aperture area. After that correction step, the recording step is performed in which the power of the signal light and that of the reference light are increased to a level at which the recording medium has sensitivity and those signal light and reference light are made incident on the recording medium so as to record hologram.

Figure 11A:
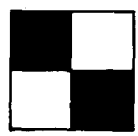
FIGS. 11A and 11B are partially enlarged plan views showing a spatial light modulator and a light-receiving unit in the pickup of the holographic recording apparatus according to the present invention, respectively.
Figure 11B:
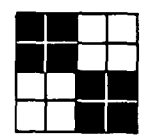

The detection of the signal light in the light-receiving unit may be achieved by detecting unit data of page data by a plurality of light-receiving elements. For example, the unit data may be detected by $n^2$ light-receiving elements. As shown in FIG. 11, in case of detecting the unit data (FIG. 11A) in the spatial light modulator by four light-receiving elements (FIG. 11B), the amount of positional offset corresponding to the half of the space occupied by the unit data can be detected in both the X- and Y-directions.

Figure 12:
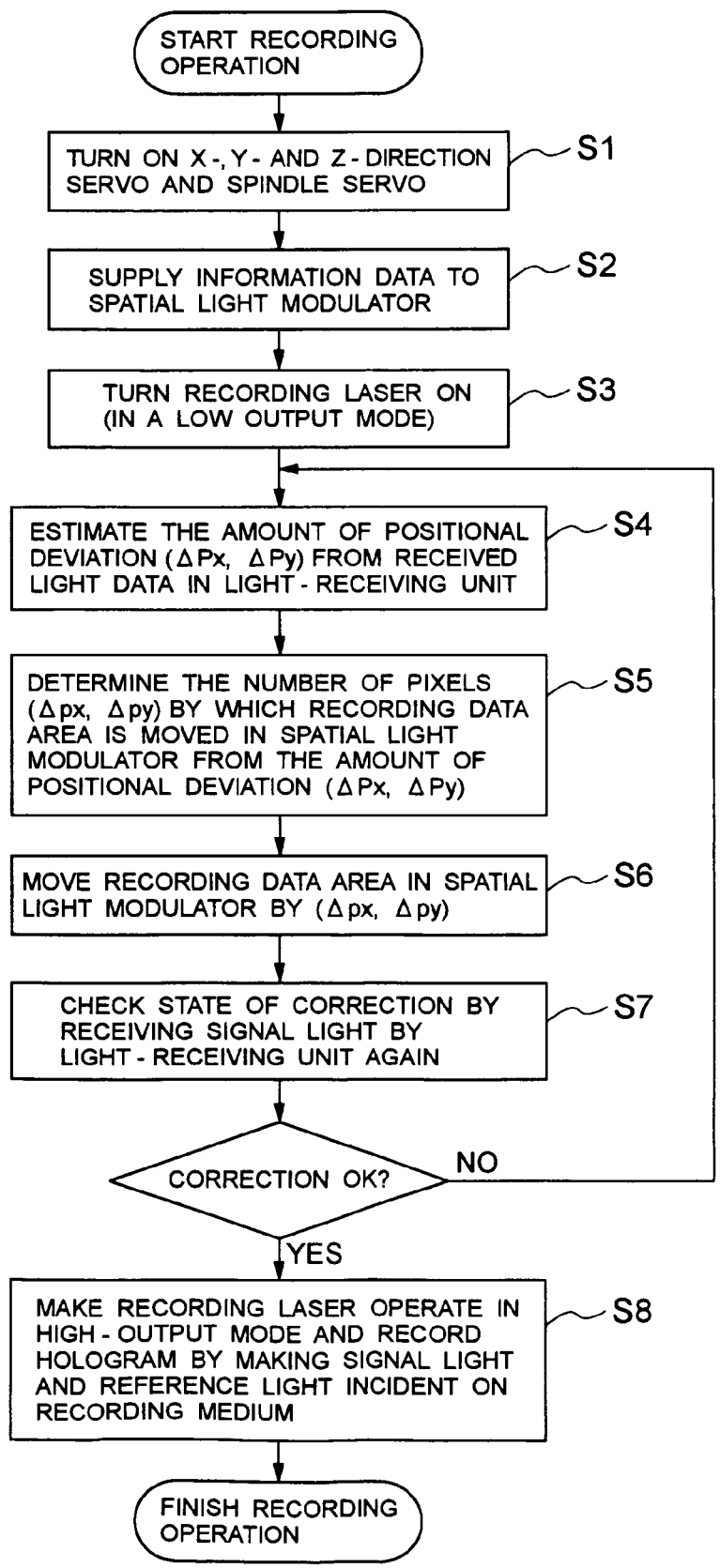
FIG. 12 is a flowchart of the holographic recording apparatus according to the present invention.

In case of detecting the unit data by $n^2$ light-receiving elements, hologram is recorded in accordance with a manner shown in a flowchart of FIG. 12, for example.

After the recording operation is started, the objective lens is moved so as to place the focus of the objective lens at a predetermined position on the recording medium by making an X-, Y- and Z-direction servo and a spindle servo work (Step S1).

After the position of the objective lens has been determined, information data containing reference mark data is supplied to the spatial light modulator (Step S2). Then, a laser beam of a low output is made incident on the spatial light modulator, thereby generating signal light that has been spatially modulated (Step S3).

That signal light is made incident on the recording medium through the objective lens, and received light data is obtained by receiving the signal light reflected from the recording medium by the light-receiving unit. Then, from the position at which the reference mark data contained in the received light data has been detected, the amount of positional offset between the optical axis of the objective lens and the optical axis of the signal light, i.e., the pixel amounts of positional offset ($\Delta Px$, $\Delta Py$) in the light-receiving unit are estimated (Step S4).

Then, pixel amounts of movement ($\Delta px$, $\Delta py$) by which a modulation area in the spatial light modulator is to move are determined from the positional offset amounts in the light-receiving unit. The pixel amounts of movement ($\Delta px$, $\Delta py$) are obtained by using the number of over-sampling, i.e., the number n of the light-receiving elements for detecting the unit data of the page data in each of the X- and Y-directions from the following expressions (Step S5).

$$\Delta Px/n = \Delta px, \Delta Py/n = \Delta py$$

Based on the pixel amounts of movement ($\Delta px$, $\Delta py$) thus obtained, the position of the recording data setting area in the spatial light modulator is moved so as to be corrected (Step S6).

Then, laser light is made incident on the spatial light modulator after the above correction has been made, so as to generate the signal light. Again, the signal light is made incident on the recording medium through the objective lens. Then, the signal light reflected from the recording medium is detected and a state of positional offset of the recording data setting area with respect to the aperture area of the objective lens is checked (Step S7).

At this time, if the correction has not been completed yet, the flow goes back to the step S4 of determining the pixel amounts of positional offset ($\Delta Px$, $\Delta Py$) in the light-receiving unit, and the step of adjusting the position of the recording data setting area in the spatial light modulator is repeated. On the other hand, when the correction has been completed, information data containing data to be recorded is supplied to the spatial light modulator. Moreover, the output of the laser light is increased and the signal light and the reference light are made incident on the recording medium, so that data is recorded (Step S8).

Please note that until the position of the recording data setting area is corrected with respect to the range of the aperture area of the objective lens, only the signal light may be made incident on the recording medium, and then both the signal light and the reference light may be made incident in the recording step.

The detection of the amount of positional offset is not limited to the case where the detection is performed on the basis of the detection of the reference position mark by the light-receiving unit as a predetermined pattern. In other words, the amount of positional offset may be detected by detection of the reference position mark by the light-receiving unit.

Figure 13:
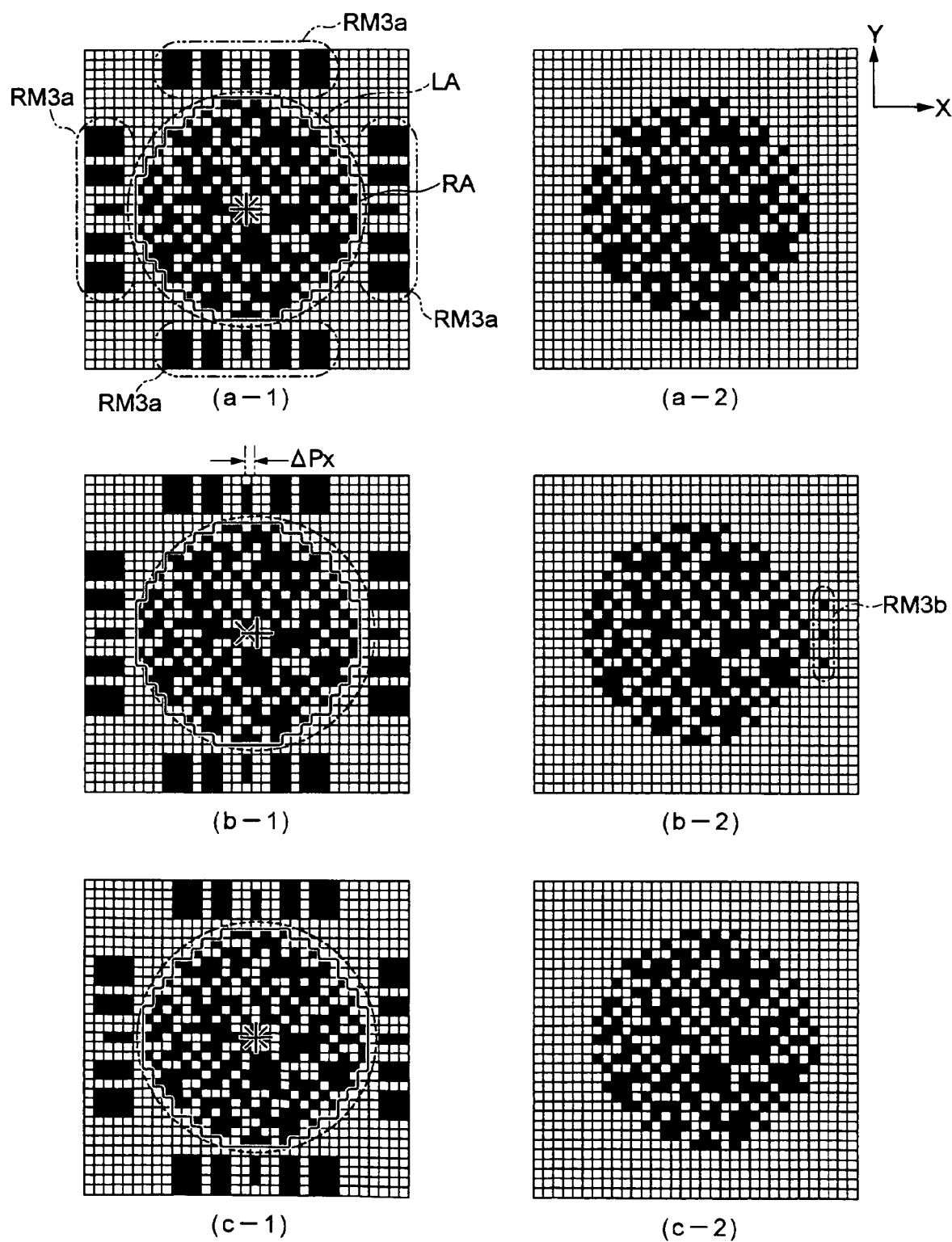
FIG. 13 shows plan views representing page data on the plane containing the plane of the objective lens on which the signal light is incident (a-1, b-1 and c-1) and page data on the light-receiving unit (a-2, b-2 and c-2) according to the holographic recording apparatus of the present invention.

For example, as shown in FIG. 13 (a-1), in the case in which the reference position mark (RM3a) forms stripes parallel to one axis, in which the line width increases as the distance from that axis increases when a predetermined line is regarded as a reference, the reference position mark (RM3a) is provided to be in contact with the aperture area LA of the objective lens on both sides in the X- and Y-directions.

In the case in which the center ("+") of the aperture area LA of the objective lens is coincident with the center ("×") of the recording data setting area RA while the objective lens is not subjected to servo control, for example, the recording data setting area is completely contained within the aperture area of the objective lens, as shown in FIG. 13 (a-1). In other words, signal light from the recording data setting area RA can pass through the aperture area LA of the objective lens. As a result, as shown FIG. 13 (a-2), the received light data detected in the light-receiving unit contains the pattern in the recording data setting area but does not contain the reference position mark. The center of the recording data setting area RA in this state is determined as the reference position.

However, when the objective lens moved in the X-direction by ΔPx because the objective lens followed the track on the recording medium, the center of the aperture area of the objective lens is off from the center of the recording data setting area (FIG. 13 (b-1)), the received light data in the light-receiving unit does not contain the pattern in the recording data setting area but contains a part of the reference position mark (RM3b) (FIG. 13 (b-2)).

Thus, the amount of positional offset (ΔPx) between the aforementioned reference position of the recording data setting area and the center of the aperture area of the objective lens after moving is obtained on the basis of the pattern of the reference position mark (RM3b) that has been detected. Then, the position of the recording setting area RA is corrected (FIG. 13 (c-1)). As a result, the light-receiving unit can receive the signal light from the recording data setting area again (FIG. 13 (c-2)). That is, the signal light from the recording data setting area can be made incident on the recording medium and therefore data to be recorded can be recorded on the recording medium.

Figure 14:
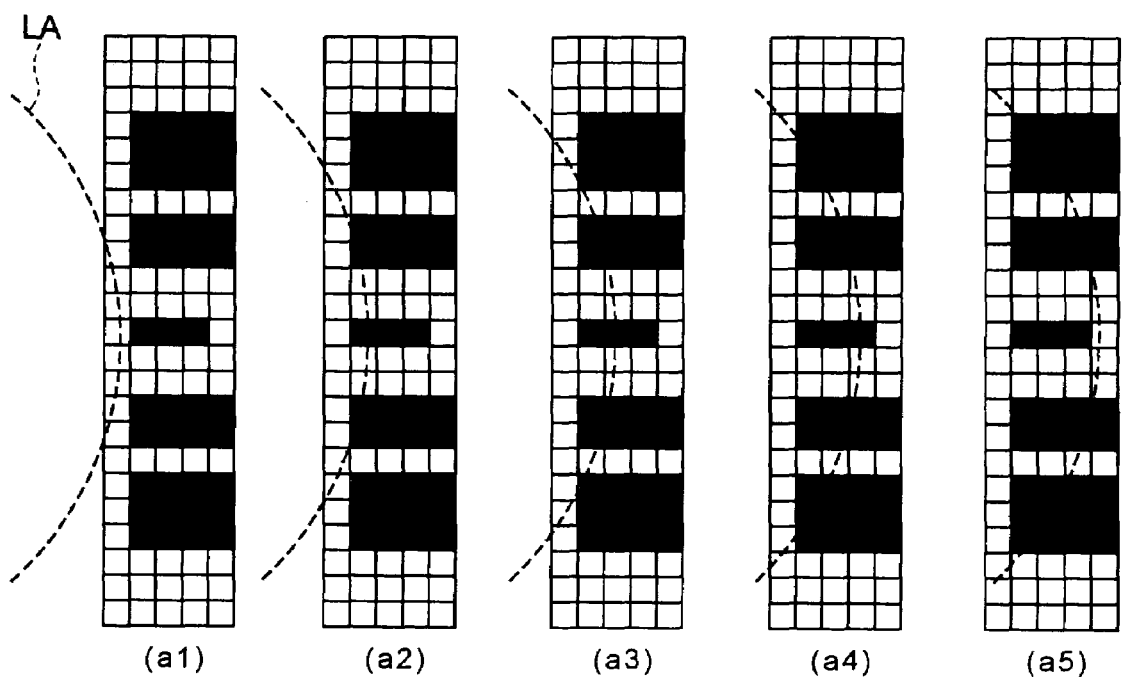
FIG. 14 shows partially enlarged plan views representing the reference position mark in the page data on the plane containing the plane of the objective lens on which the signal light is incident (a1 to a5) and on the light-receiving unit (b1 to b5) according to the holographic recording apparatus of the present invention.
Figure 14:
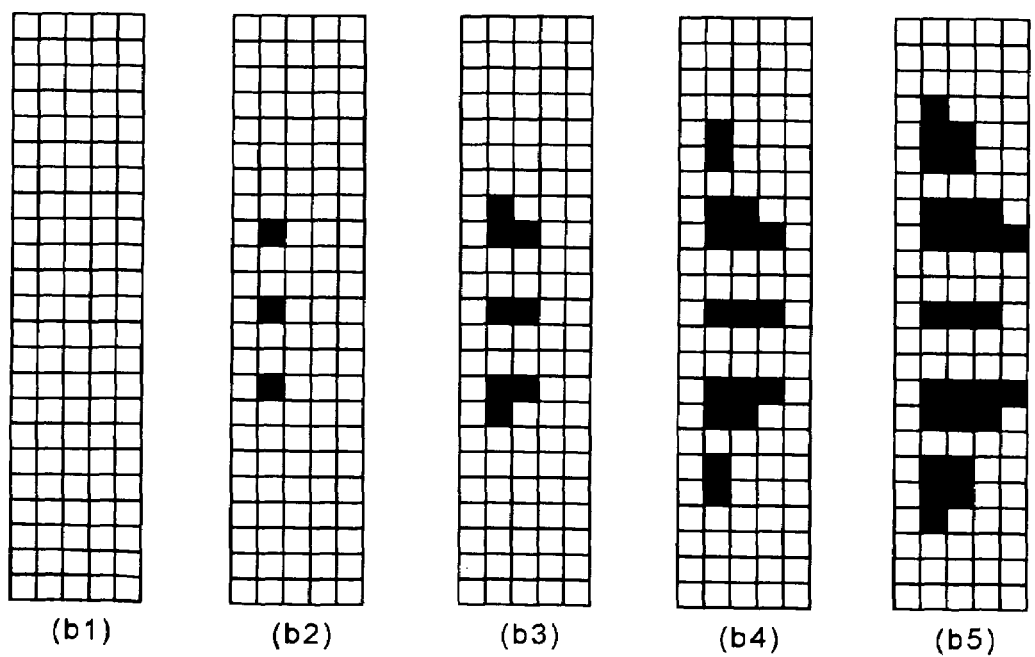

In case of using the aforementioned reference position mark, when the objective lens moves in the X-axis direction by one pixel at a time (FIG. 14 (a1)–(a5)), the step pattern including stripes spreading in the Y-axis direction with the X-axis regarded as the center is detected in the light-receiving unit (FIG. 14 (b1)–(b5)). In other words, the amount of optical positional offset between the aperture area of the objective lens and the recording data setting area can be calculated from the pattern of the reference position mark detected by the detection unit, thereby adjusting the center of the recording data setting area.

It is not necessary that data to be recorded is always supplied to the recording data setting area in the step of positioning the objective lens and the correction step. That is, the data to be recorded may be supplied to the recording data setting area in the recording step. For example, in the step of positioning the objective lens and the correction step, the information data may contains the reference mark data only, while in the recording step the information data may contain both the reference mark data and the data to be recorded or may contain only the data to be recorded. According to the flowchart of FIG. 12, for example, information data in the step S2 of supplying the information data to the spatial light modulator after the position of the objective lens has been determined may contain the reference mark data only. On the other hand, the information data in the step S8 of supplying the information data to the spatial light modulator after the position of the recording data setting area corrected and making signal light and reference light incident on the recording medium so as to record data may contain the data to be recorded only. Please note that switching of the information data between a state where the information data contains the reference mark data only and another state where the information data contains the data to be recorded only may be performed by the control circuit 27.

Moreover, in the case in which the objective lens is not movable in the Y-direction but is movable in the X-direction by the driving unit, the reference position mark may be set only in the X-direction. Alternatively, in the case in which the objective lens is not movable in the X-direction but is movable in the Y-direction, the reference position mark may be set only in the Y-direction.

A method for determining the amount of optical positional offset between the aperture area of the objective lens and the recording data setting area is not limited to the aforementioned method performed by detecting the reference position mark. For example, a position of a peak in the light intensity distribution of signal light on a light-receiving plane on which the light-receiving elements of the light-receiving unit are arranged may be detected, and the position of the recording data setting area in the spatial light modulator may be corrected on the basis of the amount of offset between the reference position of the light-receiving unit and the thus detected peak position. Please note that the light intensity distribution is a distribution of integral values of an area of a region that transmits signal light toward a direction along one of two axes forming the light-receiving plane, in a direction along the other axis.

In order to simplify the description of the correction method using the peak of the light intensity distribution, it is assumed that page data of information data supplied to the spatial light modulator forms a checkered pattern around the recording data setting area. In the recording data setting area, it is also assumed that data to be recorded forms a pattern converted so as to form a peak of the light intensity distribution at the center of the recording data setting area. Moreover, the objective lens is assumed to be movable only in the X-direction.

Figure 15:
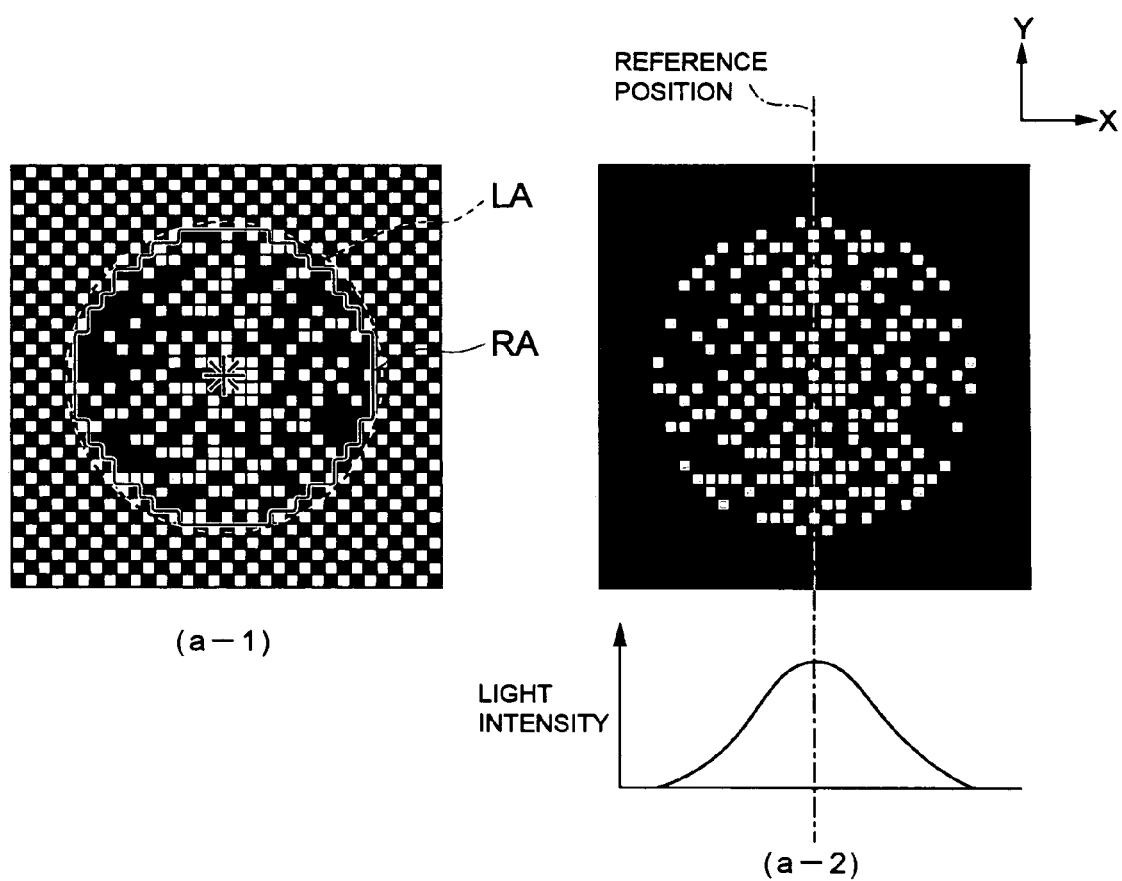
FIG. 15 shows plan views representing page data on the plane containing the plane of the objective lens on which the signal light is incident (a-1) and on the light-receiving unit (a-2) and a graph showing the light intensity distribution, according to the holographic recording apparatus of the present invention.

As shown in FIG. 15 (a-1), in the case in which the objective lens is not subjected to servo control and the center ("+") of the aperture area LA of the objective lens is coincident with the center ("×") of the recording data setting area RA, a reference position (dashed line) in the light-receiving unit determined on the basis of the center of the recording data setting area RA is coincident with the peak position in the light intensity distribution (FIG. 15 (a-2)).

Figure 16:
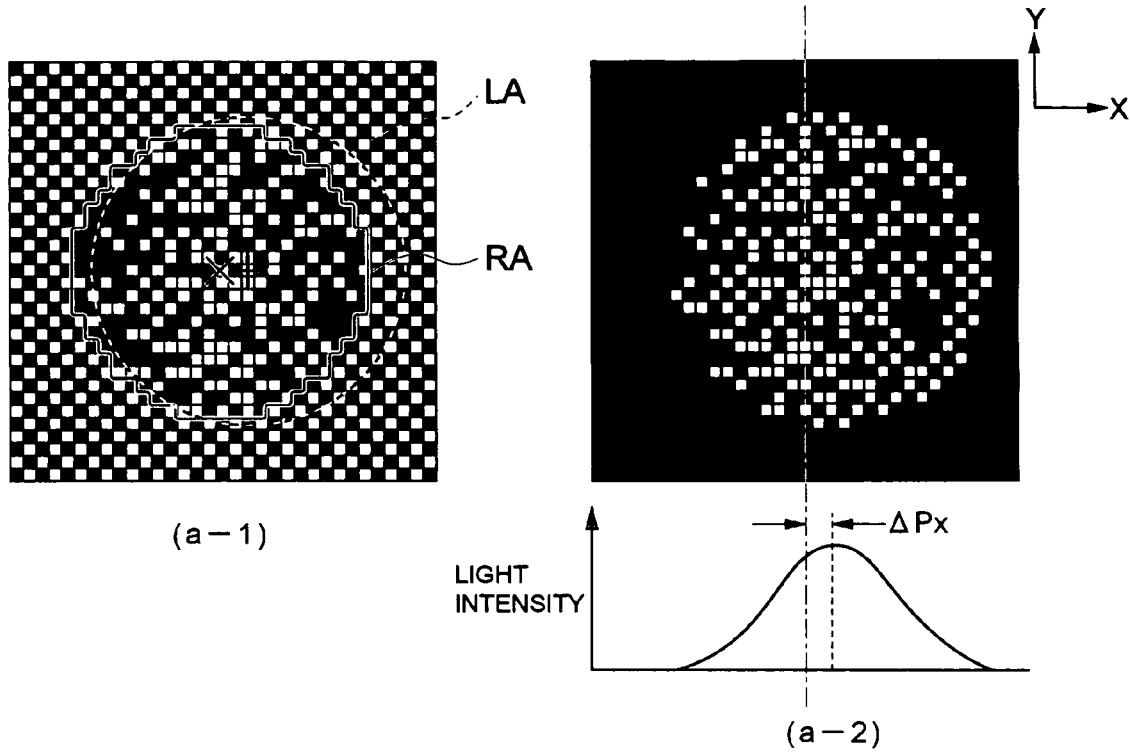
FIG. 16 shows plan views representing page data on the plane containing the plane of the objective lens on which the signal light is incident (a-1 and b-1) and on the light-receiving unit (a-2 and b-2) and graphs showing the light intensity distribution, according to the holographic recording apparatus of the present invention.
Figure 16:
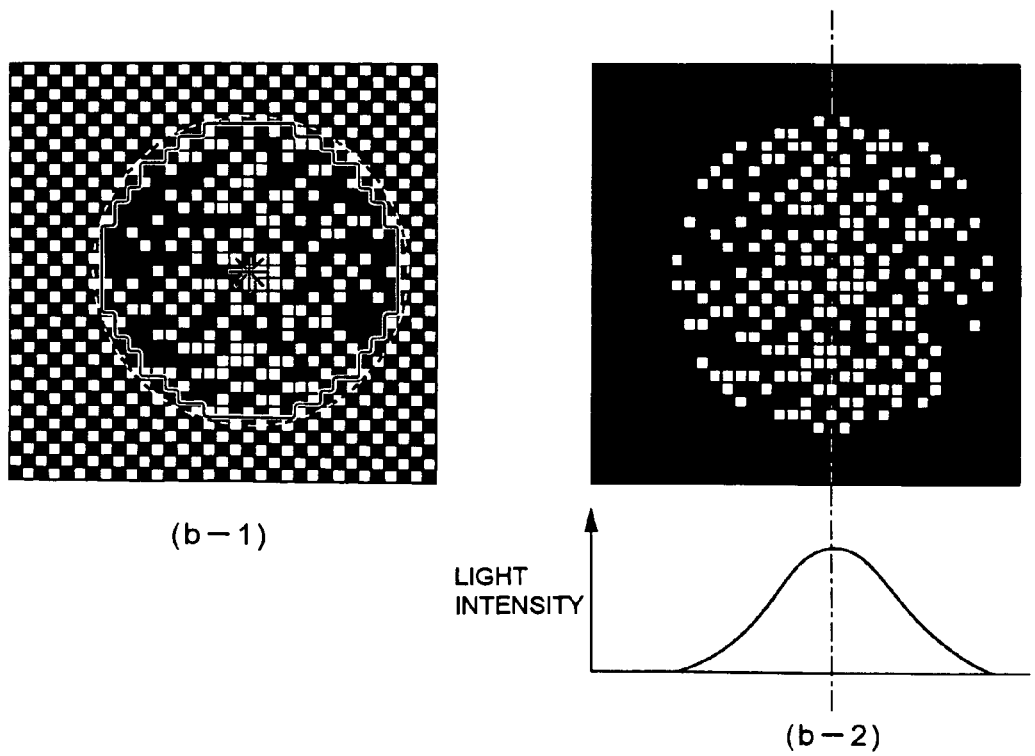

However, the objective lens moved in the X-direction, the center of the aperture area of the objective lens is off from the center of the recording data setting area, as shown in FIG. 16 (a-1), and therefore the reference position in the light-receiving unit and the peak position in the light intensity distribution are not coincident with each other (FIG. 16 (a-2)).

Thus, from the amount of positional offset ΔPx between the reference position in the light-receiving unit corresponding to the center of the recording data setting area RA and the peak position in the light intensity distribution, corresponding to the center of the aperture area LA of the objective lens, the moving amount Δpx in the X-direction on the spatial light modulator may be calculated and the position of the center of the recording data setting area in the spatial light modulator may be corrected on the basis of the calculated value (FIGS. 16 (b-1) and (b-2)).

In the correction step, the information data supplied to the recording data setting area may contain no data to be recorded. In this case, it is preferable that information data, that allows the peak in the light intensity distribution to correspond to the position of the center of the objective lens irrespective of displacement of the objective lens, be supplied to the spatial light modulator. In other words, it is preferable that the information data form page data in which a distribution of presence and absence of modulation is uniform on the two-dimensional plane of the spatial light modulator. For example, page data forming a checkered pattern in an entire space on the spatial light modulator and page data that transmits light incident on the spatial light modulator in the entire space on the spatial light modulator (i.e., presenting all white) can be used as the aforementioned information data.

In the description of the correction method of the position of the recording data setting area, the amount of positional offset is obtained with the center of the recording data setting area while servo control is not applied to the objective lens considered as a reference. However, the correction method is not limited thereto.

For example, in the case in which servo control is continuously applied to the objective lens and recording of hologram is also performed continuously, when hologram is recorded at a new position, the center of the recording data setting area in immediately before recording of hologram may be set as the reference position.

Moreover, as the reference position, the center of the aperture area of the objective lens not subjected to servo control may be set. Then, the amount of displacement of the objective lens may be obtained from the reference position and the center of the aperture area of the objective lens after moving; the amount of positional offset between the recording data setting area and the aperture area may be obtained from the thus obtained amount of displacement of the objective lens; and the position of the recording data setting area may be corrected.

In the aforementioned exemplary configuration of the pickup, the light beam from the first laser light source LD1 is incident on the spatial light modulator after passing through the first collimator lens CL1, the first half mirror prism HP1, and the mirror prism M. However, the path of the light beam is not limited thereto.

Figure 17:
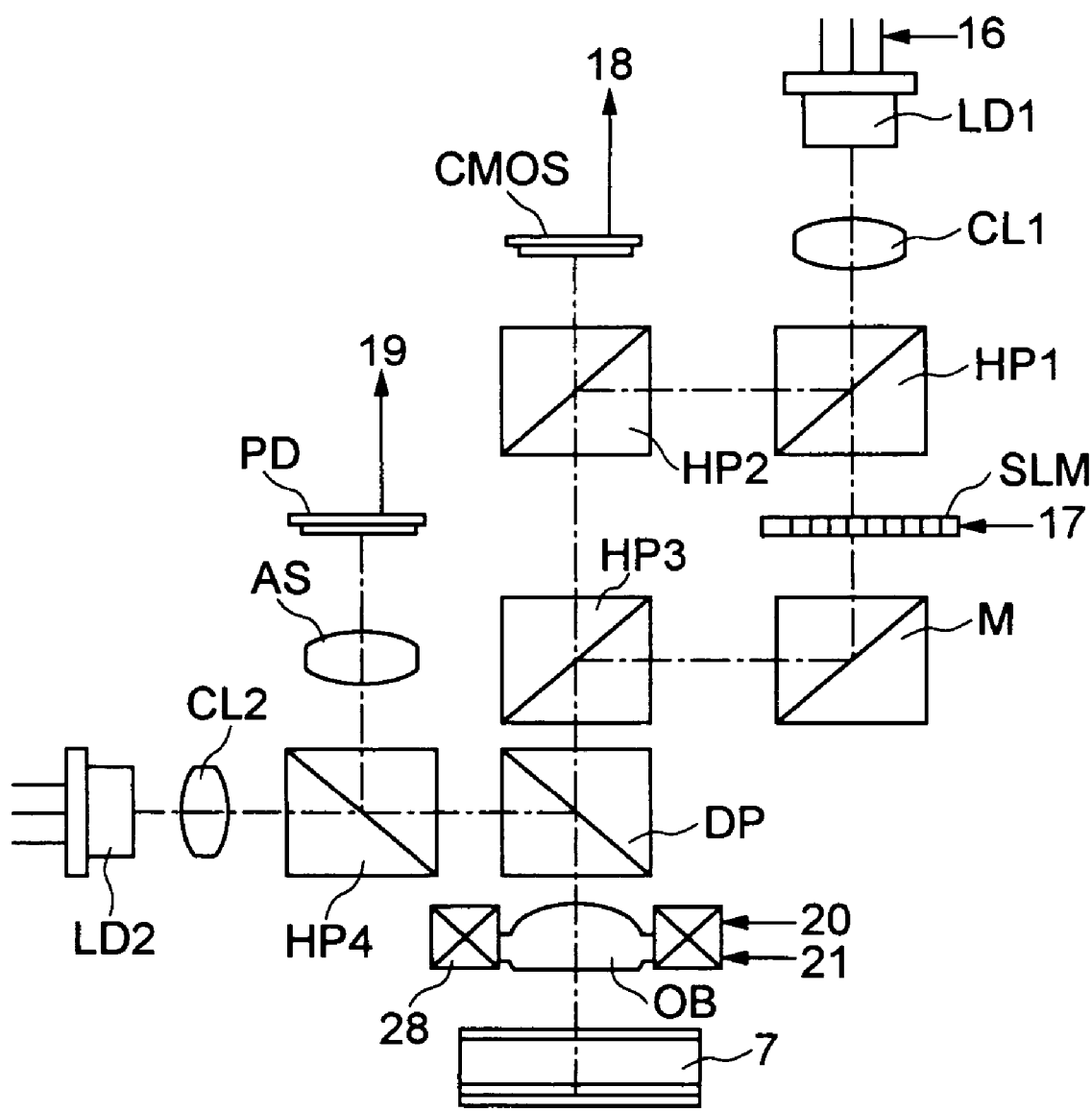
FIG. 17 is a schematic view showing the configuration of the pickup of the holographic recording apparatus according to the present invention.

For example, as shown in FIG. 17, the spatial light modulator SLM may be provided between the first half mirror prism HP1 and the mirror prism M. Except for this point, the structure shown in FIG. 17 may be the same as that shown in FIG. 5.

Figure 18:
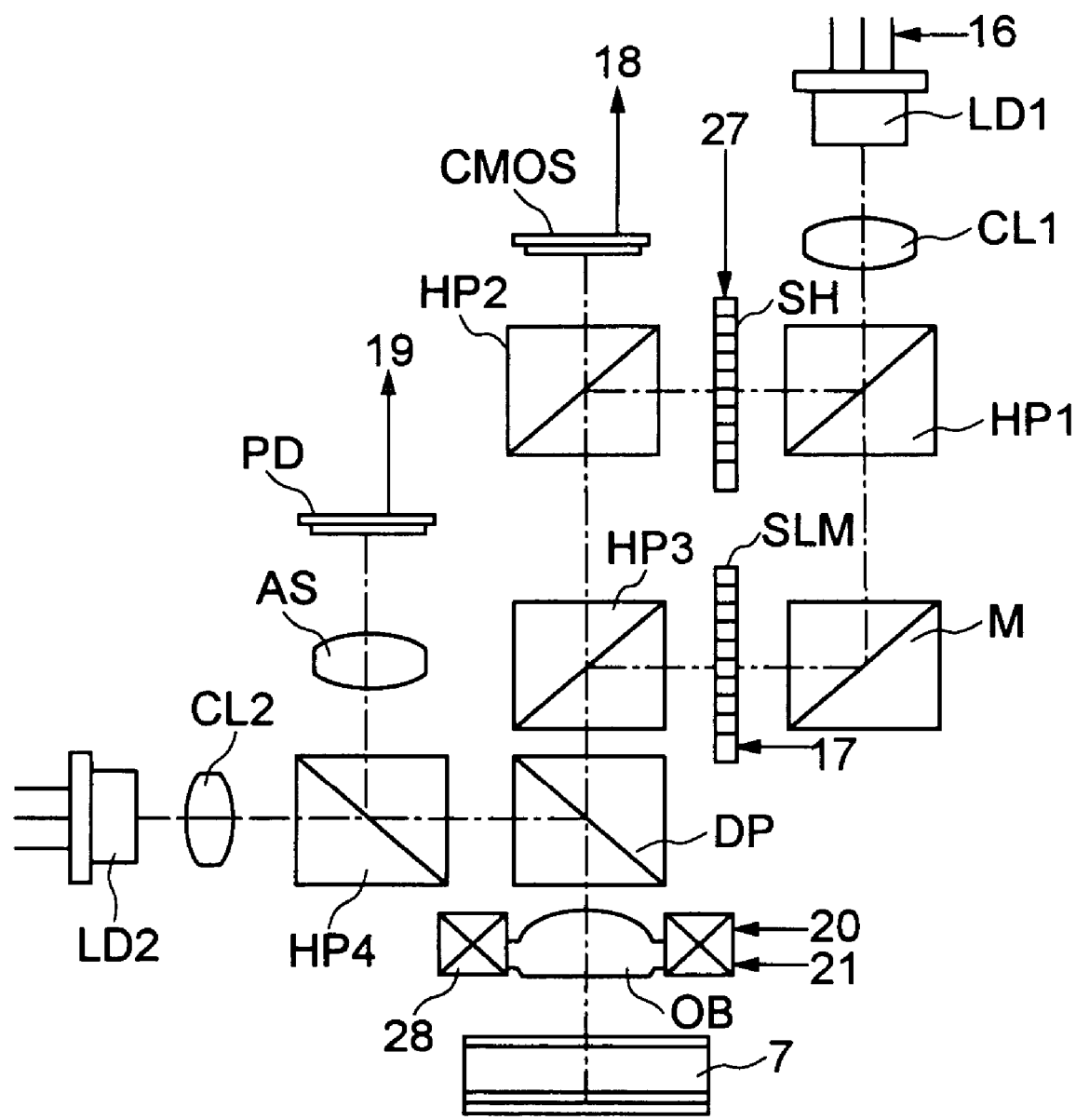
FIG. 18 is a schematic view showing the configuration of the pickup of the holographic recording apparatus according to the present invention.

In a modification of the pickup, a shutter that can block reference light may be provided in the optical path of the reference light. For example, as shown in FIG. 18, a shutter SH may be provided between the first half mirror prism HP1 and the second half mirror prism HP2. The shutter SH is a transmissive liquid crystal panel, for example, and has a function of electrically transmitting or blocking light incident thereon. The shutter SH may be connected to the control circuit 27 so that the control circuit 27 controls the above function. Except for this point, the structure shown in FIG. 18 is approximately the same as that shown in FIG. 5.

The aforementioned holographic recording apparatus corrects optical positional offset between the aperture area of the objective lens and the recording data setting area in the spatial light modulator by changing the position at which the recording data setting area is set in the spatial light modulator. However, the correction manner is not limited thereto. For example, the moving amount of the objective lens from the reference position may be measured directly by measuring device such as an optical sensor.

Figure 19:
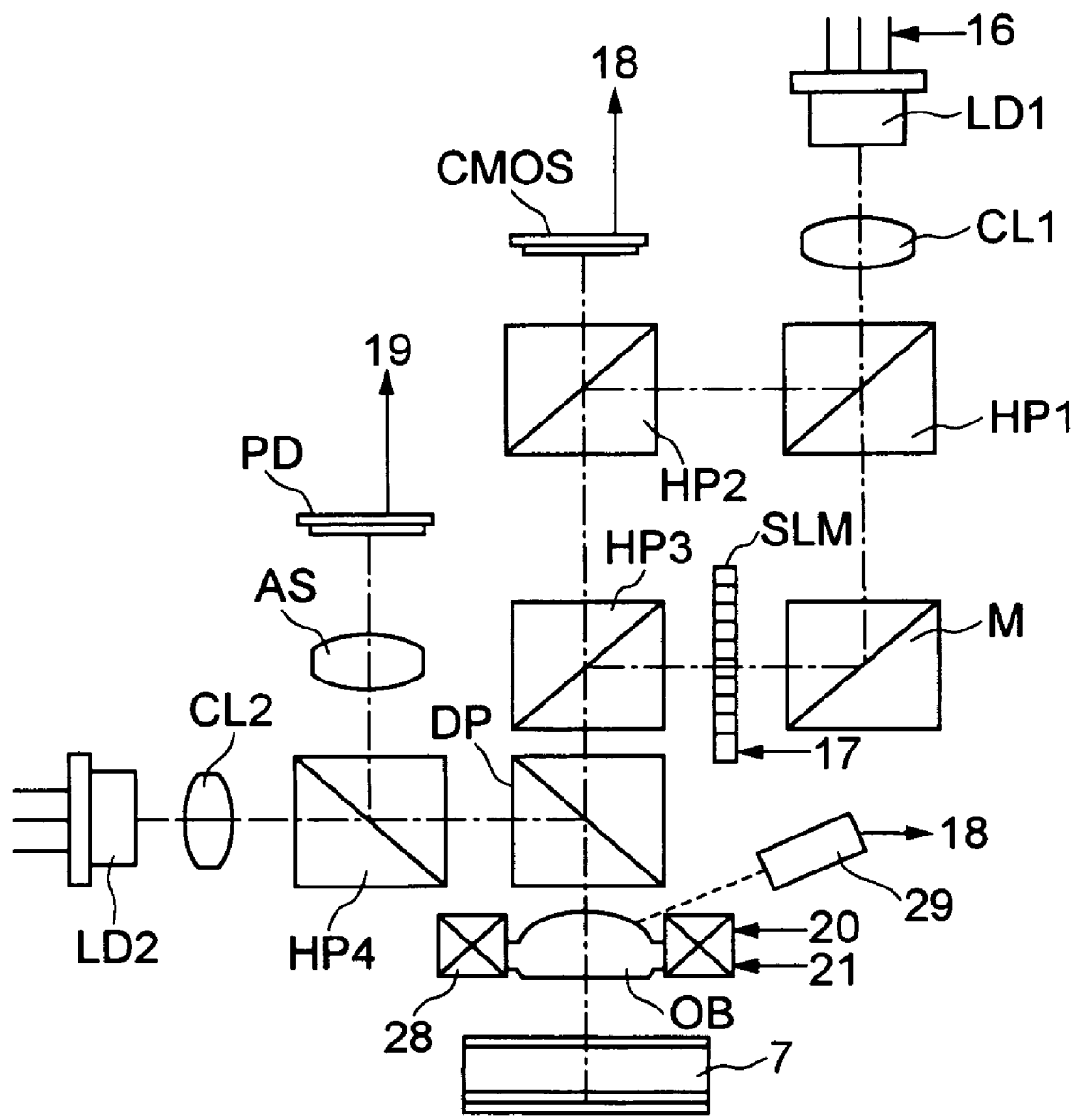
FIG. 19 is a schematic view showing the configuration of the pickup of the holographic recording apparatus according to the present invention.

For example, as shown in FIG. 19, an objective lens detection unit 29 may be provided and connected to the detection signal processing circuit 18. The objective lens detection unit 29 includes an optical sensor that can cast laser light toward the objective lens and can receive its returned light so as to obtain the amount of displacement of the objective lens. A detection signal obtained in the objective lens detection unit 29 is supplied to the detection signal processing circuit 18. The detection signal processing circuit 18 processes the detected signal to obtain a position signal corresponding to the amount of optical positional offset between the objective lens OB and the recording data setting area (not shown) in the spatial light modulator SLM and supplies the position signal to the control circuit 27. Except for the above, the structure shown in FIG. 19 may be the same as that shown in FIG. 5.

Figure 20:
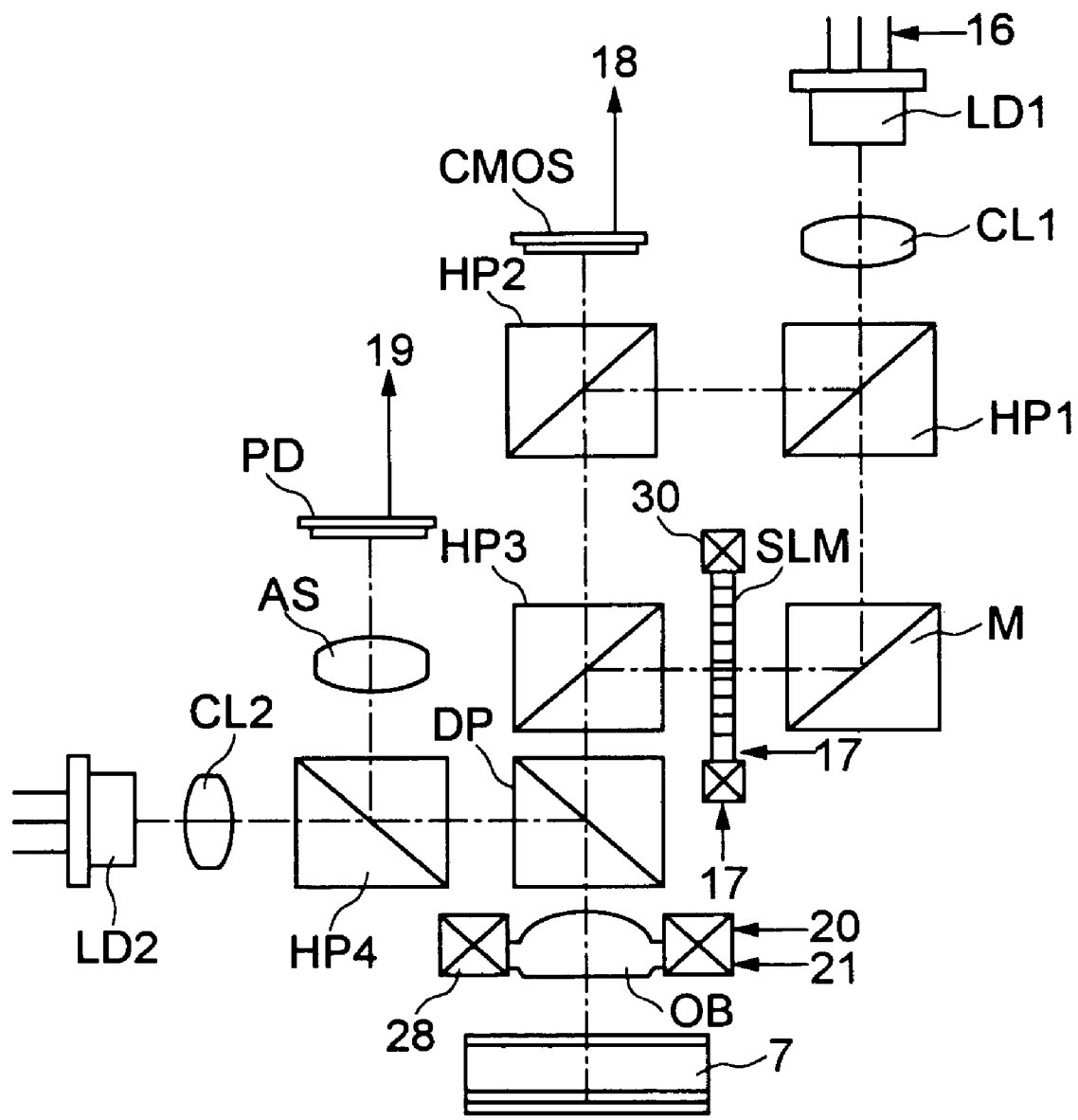
FIG. 20 is a schematic view showing the configuration of the pickup of the holographic recording apparatus according to the present invention.

In the aforementioned structure of the pickup, the unit for adjusting the optical positional offset between the aperture area of the objective lens and the recording data setting area may include unit for moving the spatial light modulator. For example, as shown in FIG. 20, a spatial light modulator driving unit 30 including an actuator that can move the spatial light modulator in a direction parallel to the plane of the spatial light modulator, i.e., in a direction perpendicular to the optical axis of laser light, may be provided and connected to the spatial light modulator driving circuit 17. The spatial light modulator driving circuit 17 receives a modulator moving signal containing both the direction in which the spatial light modulator is to be moved and the moving amount from the control circuit 27 received the position signal from the detection signal processing circuit 18. By using this modulator moving signal, the spatial light modulator driving unit 30 is operated so as to move the spatial light modulator SLM. Thereby, the positional offset between the aperture area of the objective lens and the recording data setting area is corrected. Except for the above, the structure shown in FIG. 20 may be the same as that shown in FIG. 5.

The aforementioned embodiment has been described by adopting a transmissive spatial light modulator. However, the type of the spatial light modulator is not limited thereto. A reflective spatial light modulator may be used. Moreover, a modulation method in the spatial light modulator is not limited to the method using the presence and absence of transmitted light. For example, the modulation method may use change of a polarization plane of incident light.

The holographic recording apparatus according to the present invention includes: a light source for emitting a coherent reference light beam; a signal light generation unit including a spatial light modulator for spatially modulating the reference light beam in accordance with information data to generate a signal light beam; an interference unit for directing the signal light beam and the reference light beam toward a recording medium through an objective lens to form a region of a diffraction grating formed by an optical interference pattern within the recording medium; a lens positioning unit for positioning the objective lens with respect to a recording surface of the recording medium; and a light-receiving unit for detecting a returned light beam returned from the recording medium through the objective lens, wherein the signal light generation unit includes a correction unit for detecting an amount of a optical positional offset between a recording data setting area in the spatial light modulator being supplied with said information data and an aperture area of the objective lens, and for adjusting a position of the recording data setting area in accordance with the amount of a optical positional offset. According to the thus configured holographic recording apparatus, even if the size of the space in which the signal light is modulated by the data to be recorded is set to be approximately the same or slightly smaller than that of the aperture area of the objective lens, the signal light from such a space can be transmitted through the objective lens. In other words, the recording data setting area in the spatial light modulator can be made wider until the size of the area reaches the size corresponding to the aperture area of the objective lens without depending on a range in which the objective lens is movable. Therefore, the data amount of the information data that can be supplied to the recording data setting area can be increased.

This application is based on a Japanese patent application No.2004-038578 which is hereby incorporated by reference.

What is claimed is:

1. A holographic recording apparatus comprising:
    a light source for generating a coherent reference light beam;
    a signal light generation unit including a spatial light modulator for spatially modulating the reference light beam in accordance with information data to generate a signal light beam;
    an interference unit for directing the signal light beam and the reference light beam toward a recording medium through an objective lens to form a region of a diffraction grating by an optical interference pattern within the recording medium;
    a lens positioning unit for positioning the objective lens with respect to a recording surface of the recording medium; and
    a light-receiving unit for detecting a returned beam that is returned from the recording medium through the objective lens, wherein
    the signal light generation unit includes a correction unit for detecting an amount of a optical positional offset between a recording data setting area in the spatial light modulator being supplied with said information data and an aperture area of the objective lens, and for adjusting a position of the recording data setting area in accordance with the amount of a optical positional offset.

2. The holographic recording apparatus according to claim 1, wherein
    the correction unit includes unit for obtaining the amount of the relative optical positional offset between the recording data setting area in the spatial light modulator and a range of the aperture area from received light data detected in the light-receiving unit.

3. The holographic recording apparatus according to claim 2, wherein
    the unit for obtaining the amount of the optical positional offset is unit for making the information data contain reference mark data and obtaining the amount of the positional offset based on the reference mark data contained in the received light data.

4. The holographic recording apparatus according to claim 2, wherein
    the unit for obtaining the amount of the optical positional offset is unit for obtaining the amount of the positional offset from the received light data based on a peak position in light intensity distribution of the returned beam in the light-receiving unit.

5. The holographic recording apparatus according to claim 1, wherein
    the correction unit includes unit for measuring an amount of displacement of the objective lens.

6. The holographic recording apparatus according to claim 1, wherein
    the correction unit includes unit for changing a position of the recording data setting area in the spatial light modulator.

7. The holographic recording apparatus according to claim 1, wherein
    the correction unit includes unit for moving the spatial light modulator.

8. The holographic recording apparatus according to claim 1, wherein
    the light-receiving unit receives unit data of the information data by a plurality of light-receiving elements.

9. The holographic recording apparatus according to claim 1, wherein
    the interference unit includes a shutter in an optical path of the reference light beam.

* * * * *